US006267298B1

United States Patent
Campbell

(10) Patent No.: US 6,267,298 B1
(45) Date of Patent: *Jul. 31, 2001

(54) NEURAL NETWORKED IRRIGATION CONTROLLER

(76) Inventor: Paul D. Campbell, 430 N. 600 West, Logan, UT (US) 84321

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/069,081

(22) Filed: May 28, 1993

(51) Int. Cl.$^7$ .................................................. A01G 27/00
(52) U.S. Cl. .................................. 239/70; 239/62; 239/64
(58) Field of Search .................................. 239/64, 62, 70

(56) References Cited

U.S. PATENT DOCUMENTS

| | | | |
|---|---|---|---|
| 4,799,142 | * | 1/1989 | Waltzer et al. .................. 239/70 X |
| 4,993,640 | * | 2/1991 | Baugh .................. 239/70 X |
| 5,038,268 | * | 8/1991 | Krause et al. .................. 239/70 X |
| 5,048,755 | * | 9/1991 | Dodds .................. 239/70 X |
| 5,193,570 | * | 3/1993 | Moft .................. 239/70 X |

\* cited by examiner

*Primary Examiner*—David A. Scherbel
*Assistant Examiner*—Christopher S. Kim
(74) *Attorney, Agent, or Firm*—Thompson E. Fehr

(57) ABSTRACT

A device which is neural networked with other such devices to control the irrigation of various irrigation zones. Each neural networked irrigation controller commences irrigation for its zone, provided sufficient water is available, either when a preselected period of time arrives or sensed zonal conditions so dictate. The determination of adequacy of water in the source forms the basis for neural networking. Each controller senses water level or pressure in the source and has its own initial water threshold value—a level or pressure at which irrigation will be permitted to commence. Optionally, each controller may have its own terminal water threshold value—a level or pressure which must be maintained in order for irrigation of the zone to continue. Thus, the controllers communicate hydraulically with one another. When a controller causes irrigation to commence, the water level or pressure in the source is lowered, and all controllers sense this and have their decisions affected accordingly; conversely, when a controller terminates irrigation, all controllers sense an increase in water level or pressure. If sufficient water is available in the source, irrigation of a zone will continue until either all zonal conditions have reached their specified terminal zonal threshold value or a specified period of time has passed. The start of irrigation may alternatively occur when a specified period of time has been reached.

24 Claims, 12 Drawing Sheets

NEURAL NETWORKED IRRIGATION CONTROLLER

BACKGROUND OF THE INVENTION

1. Field of the Invention

This invention relates to a device for controlling the valves, headgates, or zonal pumps which supply irrigation water based upon the sensed needs of the area to which water is intended to be supplied and on the availability of water as determined by pressure or level.

2. Description of the Related Art

An irrigation system distributes water from a source, such as a reservoir or an aquifer, to a point of utilization.

Several techniques are commonly utilized to move the water, viz., gravity flow from a reservoir into and through canals and ditches; gravity flow from a reservoir into and through a closed system of main-line and branch pipes, wherein the water is pressurized through subsequent decreases in elevation; pumping from a reservoir, canal, or river into a closed system of main-line and branch pipes, wherein the water is pressurized through the force exerted by the pump; and pumping from an aquifer into a closed system of main-line and branch pipes, wherein the water is pressurized through the force exerted by the pump.

Areas to be irrigated are generally divided into zones. Zones are established such that throughout any given zone there is a uniform water requirement as well as a device for applying water uniformly.

In the case of an open gravity-flow system, for each zone the reservoir typically may either lead to a canal from which a ditch goes to the zone, or the ditch may go directly from the reservoir to the zone. With either option, the flow of water into the ditch for a given zone is regulated by a headgate, i.e., a headgate between the canal and the ditch or between the reservoir and the ditch, or a pump, designated the zonal pump, which lifts water from the canal or reservoir to the ditch. Generically, it may be said that the headgate or zonal pump is between the source and the ditch. When the headgate is opened or the zonal pump is actuated, water flows into the ditch and, consequently, to the zone.

When a pressurized main-line pipe is utilized, for each zone a branch pipe normally goes from the main-line pipe to the zone. A valve connects the main-line pipe to the branch pipe. When the valve is opened, water flows into the branch pipe and, consequently, to the zone. If the zone is sufficiently higher than the main-line pipe, however, it may be necessary both to open a valve and to actuate a zonal pump.

The purpose for applying water to the zone may be agricultural or industrial. Agricultural goals include stimulating plant growth, avoiding dryness, protecting against excessive heat, and precluding freezing. Industrial uses comprise the treatment of waste water and the leaching of minerals.

An irrigation system may be monitored and controlled manually. This necessitates having an individual observe the conditions in each zone. When the individual determines that a zone requires irrigation, such individual ascertains whether adequate water is available. If it is, this individual then opens the appropriate headgate or valve and does not close it until either learning that the needs of the zone have been met or that insufficient water remains in the source to continue supplying water to the zone.

As the demand for, and prices of, water and the cost of energy to operate pumps have increased, there has been a corresponding trend to automate the operation of irrigation systems.

U.S. Pat. No. 4,791,948 of John J. Bayat explains the use of a timer to regulate, with no sensory input, the operation of associated sprinklers.

A variety of patents have gone beyond this simple concept to detect physical conditions—principally moisture in the soil—and use this data to influence the operation of the irrigation system.

A sensor containing logic to prevent a valve from supplying water to a sprinkler located near the sensor when moisture in the soil exceeds a preset value was introduced in U.S. Pat. No. 4,852,802 of Jerry R. Iggulden and Donald A. Streck. This device, however, had no means for communicating with other such controllers.

Centralized control seems to provide the desired communication in all other patented devices that utilize sensory detection in the automated operation of an irrigation system.

The invention in U.S. Pat. No. 4,875,498 of T. Arthur Andrews and D. Glenn Gibson also concentrates on a detector for soil moisture which will preclude watering when the moisture in the soil is too high. It operates only when instructed to do so by a central controller which can, additionally, override the effect of the detector. The central controller is disclosed, but not claimed, to be actuated by a timer switch, a temperature or freeze switch, or a light-responsive switch.

U.S. Pat. No. 4,545,396 of Richard N. Miller and K. Bruce Ray deals with a system which employs detectors to measure impedance of the soil. Reactance is said to be indicative of the moisture in the soil; resistance, of the salinity in the soil. Information from the detectors is sent to a measuring device and a control device. The disclosure indicates these would be centrally located; but the claims could be read such that each zone would have its own measuring device and control device, in which case there would be no communication among such devices for different zones. Reactance measurements would be used to determine when to start and stop watering; resistance measurements, when to add fertilizer to the water.

Similarly, the system associated with U.S. Pat. No. 4,548,225 of Dwight J. Busalacchi uses a sensor to measure soil moisture and initiates as well as precludes the flow of water in accordance with preset values. The automatic control means is connected to the main valve for each field that is to be watered. The claims suggest, and lines 35 through 37 in column 3 of the disclosure clarify, that the control means is centralized.

Again, although the claims do not indicate explicitly whether control is centralized, the irrigation control system in U.S. Pat. No. 5,023,787 of Rene H. Evelyn-Veere would seem to necessitate centralized control; and the disclosure, on lines 20 through 24 of column 4, discusses a basic automatic irrigation control system involving a central computer. The invention, moreover, ". . . controls irrigation schedules to regulate pump operation to provide an approximately level demand for pump capacity over a complete watering cycle . . ." without exceeding flow limitations of the distribution system to assure that ". . . water pressures and actual flow rates would [not] be diminished." And the system is capable of considering a weather evapotranspiration value which is provided by the operator of the system and which is representative of the then current weather conditions.

The irrigation control system in U.S. Pat. No. 5,048,755 of Graeme C. Dodds is clearly disclosed to have a central computer which can communicate with an encoder by telephone, radio waves, microwaves, or fibre optics. The encoder has a back-up memory and, to reduce the extensive quantity of wiring associated with centralized irrigation control systems, uses only two wires (or optical fibres) to send coded signals to the devices that activate valves. Each such device is, through a decoder, activated by its own code. In the preferred embodiment, the central computer also receives data from a weather station; and watering cycles are commenced when a condition based on time or weather is reached. Additionally, a flow transducer and a pressure transducer in the main pipe provide data to the central computer; and local field conditions such as moisture, rain, or wind may be sensed and provided to the computer. When a watering cycle is commenced, valves continue to be opened ". . . until the actual flow rate, as measured by the flow transducer . . . , substantially reaches the available design flow rate determined by factors such as the diameter of the supply pipe . . . , whilst maintaining a minimum predetermined design pressure as sensed by the pressure transducer . . ."

Although this last patent partially solved the problem of the extensive wiring required for communication among a central control unit and local control devices, it did not eliminate this difficulty. Centralized control, moreover, complicates design as well as installation of an irrigation control system and interposes significant obstacles to altering the system once it has been built.

SUMMARY OF THE INVENTION

The instant invention has the ability to sense physical conditions within a zone and optimize the use of available water without the complexity of centralized control. It is used in two or more zones.

The controllers for each zone communicate with one another through the concept of neural networking.

To understand how neural networking operates among the controllers, it is first necessary to comprehend how the controller functions.

Each controller is connected to the means for allowing water to flow from the source to the zone associated with the controller. In the case of an open gravity-flow system, this would be the actuator for the headgate that is located between the ditch and the reservoir or canal or a pump, designated the zonal pump, which lifts water from the reservoir or canal to the ditch. When a pressurized main-line pipe is utilized, it would be a valve that connects the main-line pipe to the branch pipe for the zone and, if the zone is sufficiently higher than the main-line pipe, a zonal pump.

Except for an embodiment discussed below in which the commencement of irrigation is governed by the arrival of a preselected period of time, each controller also has a means for measuring at least one zonal condition, such as moisture in the soil, temperature, evaporation, or dryness (surface moisture or moisture on the outside of a leaf from a plant), which is used to determine when to irrigate the zone. This involves hardware or software or a combination thereof that is customarily used in the art quantitatively to interpret the signals from a sensor appropriate for the type of zonal condition being considered. The numerical value for a zonal condition at which a user of the irrigation control system has selected irrigation to commence is termed the initial zonal threshold value. Of course, the controller has a means for setting the initial zonal threshold value, such as a dial, keypad, or other input device, designated the initial zonal threshold dial, keypad, or input device and a memory, such as an electronic or magnetic memory, for storing the value.

If desired, a default value can be placed in the memory when the controller is manufactured; this value will remain in the controller until entry of a new initial zonal threshold value by the user or until the value is modified heuristically by the controller.

Additionally, each controller has a means for measuring the availability of water in the source. Again, this is hardware or software or a combination thereof customarily used in the art quantitatively to interpret the signals from a sensor. With an open gravity-flow system, this sensor would be a level detector; for a pressurized main-line pipe, it would be a pressure sensor such as a pressure transducer. Of course, many specific types of sensors for measuring level or pressure are commercially available and would be satisfactory. (Since, as explained above, a valve, headgate, or zonal pump regulates the flow of water from the source to the zone associated with a controller, the sensor for measuring the availability of water in the source is positioned upstream from the valve, headgate, or zonal pump.) When the controller for a given zone has determined, through logic circuitry involving hardware or software or a combination thereof that is well known in the art, that the initial zonal threshold value has been reached, the logic circuitry also uses data from the level detector or pressure sensor to determine whether sufficient water is available to start irrigating the zone. The numerical value for the minimum level or pressure which must exist in order to allow irrigation to commence is designated the initial water threshold value. Again, the controller has a means for setting the initial water threshold value, such as a dial, keypad, or other input device, termed the initial water threshold dial, keypad, or input device and the memory discussed above for storing the value, although in some embodiments, the value entered for the initial water threshold value may subsequently be adjusted by an internal intelligent control algorithm programmed into the controller. And a default value for the initial water threshold value may be entered when the controller is manufactured. Upon installation, each controller should be calibrated so that a given water level or pressure will result in approximately the same measurement by every controller.

When more than one zonal condition is measured, the controller is programmed to evaluate both conditions in order to determine when irrigation should commence. For example, when excessive fruit temperature is detected, the controller would allow irrigation of a fruit crop to commence, in order to cool the fruit, at a higher initial zonal threshold value for moisture in the soil than it would otherwise permit for moisture in the soil so that the fruit would be cooled even though additional water was unnecessary to satisfy soil moisture needs. Optionally, when excessive heat is detected, the controller could also be programmed to permit irrigation to commence at a lower initial water threshold value than would otherwise be allowable. Similarly, the controller can be programmed to adjust the initial water threshold value in accordance with the deviation of measured zonal conditions from the initial zonal threshold values; for example, the initial water threshold value could be lowered proportionally to the difference between the measured soil moisture and the initial zonal threshold value for soil moisture.

Another option exists for an irrigation system that utilizes a pressurized main-line pipe in which the pressure is created by a pump. The efficiency of a pump will be optimized if it is operated such that the pressure it develops is within a given range. An optimum efficiency range is specified by the manufacturer of the pump and can be programmed into each controller so that the logic circuitry of the controller will permit irrigation of a zone to commence only when the pressure in the main-line pipe is within the desired range, rather than when an initial water threshold value is reached. Further optimization of the efficiency for the pump can optionally be achieved by adjusting initial zonal threshold values so that watering will commence earlier than would otherwise occur when the water pressure in the main-line pipe exceeds the optimum efficiency range. The optimum efficiency range is entered into the memory through a dial, keypad, or other input device, designated the pressure range dial, keypad, or input device.

For any of the types of irrigation systems, there is an additional option. The controller is programmed to compare measurements of water level or pressure over time. The controller is also programmed to preclude the commencement of irrigation until the water level or pressure has stabilized. Of course, the programming would be done in the logic circuitry, and prior measurements would be stored in the memory.

With any option neural networking of controllers is achieved hydraulically through the water in the source, i.e., the reservoir, the canal, or the main-line pipe. When any controller initiates irrigation in its zone, the water level in the reservoir or canal or the pressure in the main-line pipe will decrease. (Since it is the controller, based upon an evaluation by that controller of data provided to or generated by such controller, that initiates irrigation in its zone, control is accomplished locally by the controller, itself.) This change is communicated hydraulically to the other controllers in the system. And the more controllers which have started irrigation, the greater the drop will be. The level detector or pressure sensor for each controller will detect this drop; and if the drop causes the water level or pressure to decrease below the initial water threshold value, no controller will then permit irrigation to commence in its zone. Similarly, when a controller terminates irrigation in its zone, the water level or pressure will rise and be detected by the level detector or pressure sensor for each controller. (Since it is the controller, based upon an evaluation by that controller of data provided to or generated by such controller, that terminates irrigation in its zone, control is accomplished locally by the controller, itself.) Additionally, when the controllers have been programmed to preclude the commencement of irrigation until the water level or pressure has stabilized, the commencement or termination of irrigation in any zone will temporarily preclude the commencement of irrigation in any other zone. The interaction of controllers in a system is herein termed neural networking.

Once a controller has commenced irrigation in its zone, the headgate, valve, or zonal pump actuated by such controller will, in one embodiment, remain open for a duration of time that is programmed into the controller by the user through a means for setting the duration of irrigation, such as a dial, keypad, or other input device, designated the duration of irrigation dial, keypad, or input device, and stored in the memory. A default value may be placed in the memory when the controller is manufactured. Of course, in this embodiment the controller would include a means for determining the chronological length of irrigation, i.e., a timer.

In an alternate embodiment, the headgate, valve, or zonal pump will remain open or actuated until all measured zonal conditions or a preprogrammed subset of such measured zonal conditions has reached the preselected values, designated the terminal zonal threshold values, for each such zonal condition. The controller has a means for setting each terminal zonal threshold value, such as a dial, keypad, or other input device, designated the terminal zonal threshold dial, keypad, or input device, and the memory for storing the value. Again, a default value may be placed in the memory when the controller is manufactured.

There does exist, however, an embodiment with which the option discussed in the immediately preceding paragraph would be unavailable. This embodiment eliminates the means for measuring at least one zonal condition, the means for setting the initial zonal threshold value for each measured zonal condition, and the means for setting the terminal zonal threshold value for each measured zonal condition. It has, instead, a means for determining the time, such as a clock, and a means for setting periods of time within which irrigation may commence. The means for setting periods of time is a dial, keypad, or other input device, designated the periods of time dial, keypad, or input device and the memory. It is used to provide the clock with the appropriate solar chronological measurements, such as year, month, day, hour, minute, and second, as well as the solar chronological periods within which the user wishes to permit irrigation to commence. With this embodiment, irrigation of a zone will, consequently, commence when the time is within a period so specified and the initial water threshold value for the zone has been attained.

Normally a single dial, keypad, or input device will serve as the initial zonal threshold dial, keypad, or input device; the initial water threshold dial, keypad, or input device or pressure range dial, keypad, or input device; and the terminal zonal threshold dial, keypad, or input device or duration of irrigation dial, keypad, or input device or, for the embodiment described in the immediately preceding paragraph, as the periods of time dial, keypad, or input device and the initial water threshold dial, keypad, or input device or pressure range dial, keypad, or input device.

In still another option, both duration of time and the attainment of preselected values for measured zonal conditions are considered in deciding when to terminate irrigation. Irrigation will continue until all measured zonal conditions or a preprogrammed subset of such measured zonal conditions has reached the preselected values unless the set duration of irrigation is reached first, at which point of time irrigation will be terminated.

Another option is, also, desirable. If the water level or pressure decreases—for any reason—below a value designated the terminal water threshold value, each controller, having determined this status through its logic circuitry, would, again through its logic circuitry, send a signal to the valve, headgate actuator, or zonal pump to terminate irrigation in its zone. (Once again, since it is the controller, based upon an evaluation by that controller of data provided to or generated by such controller, that terminates irrigation in its zone, control is accomplished locally by the controller, itself.) The controller has a means for setting the terminal water threshold value, such as a dial, keypad, or other input device, designated the terminal water threshold dial, keypad, or input device, and the memory for storing the value. Again, a default value may be placed in the memory when the controller is manufactured; and normally a single dial, keypad, or input device will be used to set the terminal water threshold value as well as the other values discussed above which are set with a dial, keypad, or input device. The initial water threshold value and the terminal water threshold value are collectively termed the water threshold values.

When, however, an optimum efficiency range is programmed into the controller, rather than an initial water threshold value, no terminal water threshold value is placed in the controller; but the optimum efficiency range includes a dead band as is well known in the art of control theory. The dead band starts at the beginning of the optimum efficiency range and ends significantly before the conclusion of the optimum efficiency range. The logic circuitry of the controller will, preferably, not permit irrigation to commence until the pressure in the main-line pipe has reached the upper end of the dead band but will allow irrigation to continue until the pressure falls below the lower end of the dead band, i.e., the beginning of the optimum efficiency range.

Just as having a dead band in the optimum efficiency range is preferable, so is having the terminal water threshold value substantially lower than the initial water threshold value. Both prevent the various embodiments of the controller from entering a cycle where irrigation is started, stopped, started again, etc. because of the increase and decrease in water level or pressure which accompanies the commencement and termination of irrigation in the zone regulated by the controller.

Also, apart from avoiding such a cycle, having all controllers terminate irrigation simultaneously may be undesirable. Therefore, a still further option is to assign a distinct terminal water threshold value to each controller within an irrigation control system. Controllers will then terminate irrigation sequentially until the water level or pressure exceeds the terminal water threshold values of the remaining controllers. At least five techniques exist for assigning the discrete terminal water threshold values. First, a discrete terminal water threshold value may simply be programmed into each controller. Second, each controller could be programmed to calculate its discrete terminal water threshold value by generating a random number within a range of desirable terminal water threshold values. Third, each controller could be programmed to calculate its discrete terminal water threshold value as a value that will be higher as the elapsed time since the controller commenced irrigation increases. Fourth, each controller could be programmed to calculate its discrete terminal water threshold value as a value that will be lower as the elapsed time since the controller commenced irrigation increases. And fifth, each controller could be programmed to calculate its discrete terminal water threshold value in accordance with the formula $$[(H-L)(i-1)/(n-1)]+L$$

where n is the number of controllers in the system, i is a unique controller index number—an integer greater than or equal to 1 and less than or equal to n that is unique to each controller—assigned to the controller, L is the lowest desired terminal water threshold value for any controller in the system, and H is the highest desired terminal water threshold value for any controller in the system. Of course, when calculations are required to be performed, the controller would include calculating circuitry involving hardware or software or a combination thereof that is well known in the art; and when elapsed time is involved in the calculation, the controller would also include a timer.

Finally, one additional major alternate embodiment exists. When two or more zones are in sufficient proximity to one another, one controller can regulate the irrigation of all such zones. In such a case, the multi-zone controller would be neural networked with other multi-zone controllers, other single-zone controllers, or a combination of other multi-zone controllers and other single-zone controllers.

Each multi-zone controller for which the decision to commence irrigation is based, in part, upon one or more zonal conditions has a means for measuring at least one zonal condition for each zone the irrigation of which it regulates. Data from the zonal condition measuring means for a given zone will be used to determine the response of the controller for that one zone only. And each multi-zone controller for which the decision to commence irrigation is based, in part, upon the arrival of a specified period of time has a means for determining the time and a means for setting periods of time for each zone associated with the multi-zone irrigation controller within which irrigation of the zone may commence. Each multi-zone controller will, however, have only one means for measuring the availability of water in the source, i.e., the level detector or the pressure sensor. Thus, a common measured value for water level or pressure exists for all zones regulated by a single multi-zone controller. Otherwise, neural networking functions with multi-zone controllers the same way it does for single-zone controllers.

BRIEF DESCRIPTION OF THE PREFERRED EMBODIMENT

Several variations exist for the Neural Networked Irrigation Controller.

Figure 1:
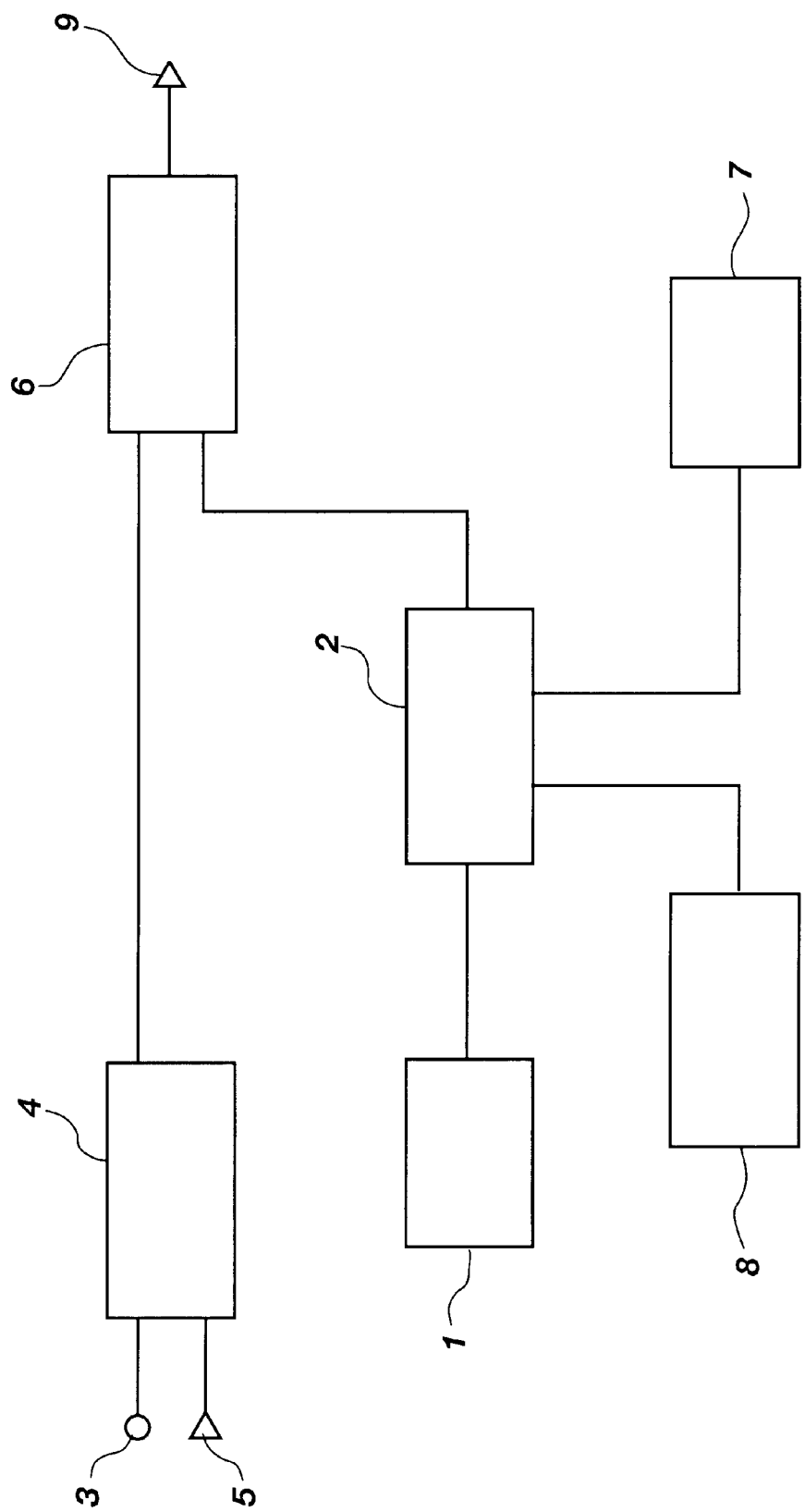
FIG. 1 shows a single-zone irrigation controller into which can be programmed either a discrete terminal water threshold value or an optimum efficiency range or which can calculate its own terminal water threshold value based upon the elapsed time of irrigation or otherwise, which causes irrigation to commence either as a result of measured zonal conditions or the arrival of a specified period of time, and which uses either time or measured zonal conditions or a combination of these to determine when irrigation should terminate.
Figure 2:
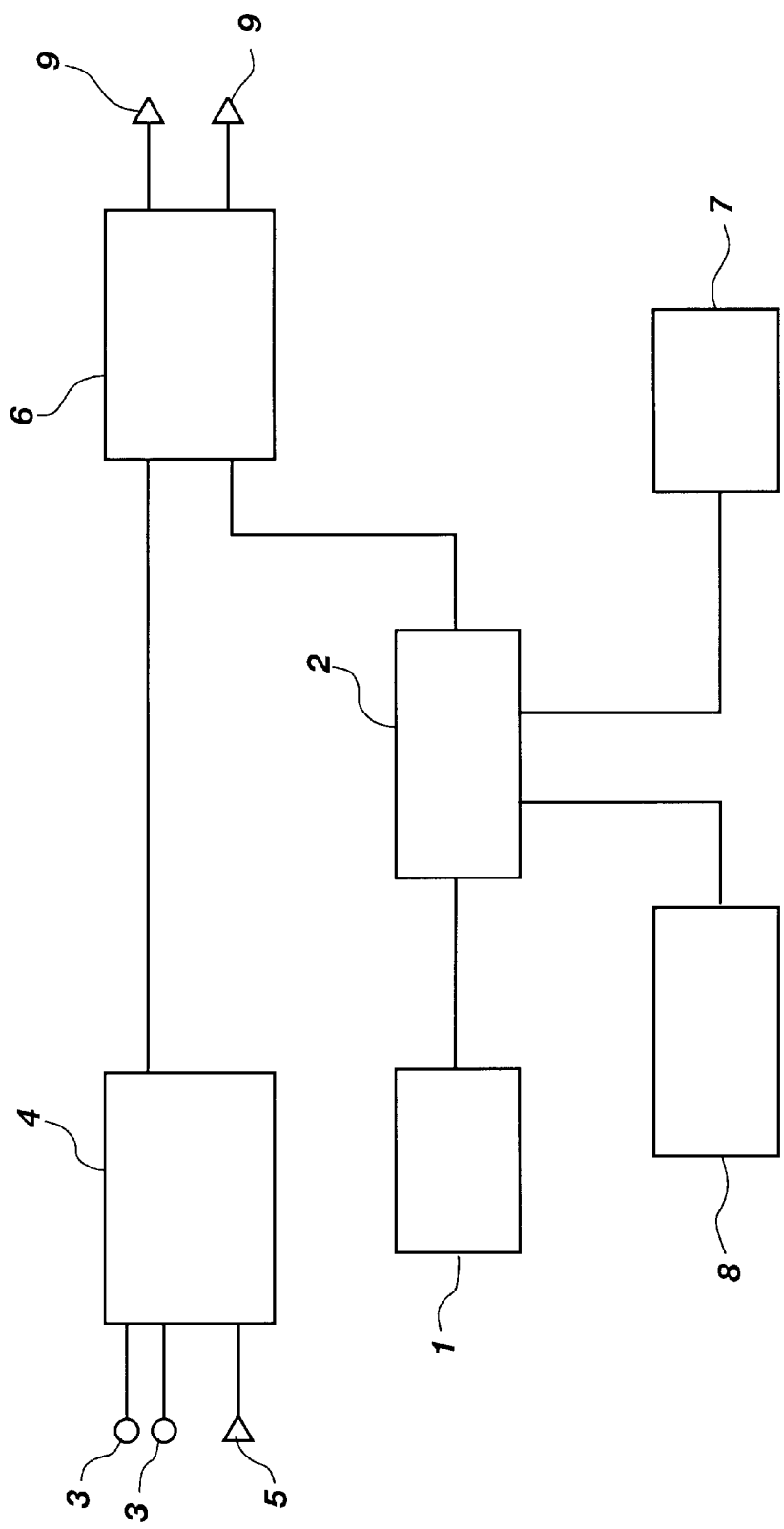
FIG. 2 depicts a multi-zone irrigation controller into which can be programmed either discrete terminal water threshold values or an optimum efficiency range or which can calculate its own terminal water threshold values based upon the elapsed time of irrigation or otherwise, which causes irrigation to commence either as a result of measured zonal conditions or the arrival of a specified period of time, and which uses either time or measured zonal conditions or a combination of these to determine when irrigation should terminate.

The embodiment of the single-zone irrigation controller possessing the most components and, consequently, the most functional options is portrayed in FIG. 1. FIG. 2 illustrates a similar embodiment of the multi-zone irrigation controller. The subsequent Figures display embodiments of these controllers in which some components and, thus, some functional options have been eliminated.

In FIG. 1, the keypad (1) is connected to the memory (2) and is operated by the user—or the manufacturer—to enter into the memory (2) the optimum efficiency range or the initial water threshold value, the terminal water threshold value, the initial zonal threshold values, and the terminal zonal threshold values.

The controller also has at least one zonal input terminal (3) to which may be connected a sensor appropriate for the type of zonal condition—such as moisture in the soil, temperature, evaporation, or dryness (surface moisture or moisture on the outside of a leaf from a plant)—which the user wishes to measure. The zonal input terminal (3) is connected to a measuring unit (4) which contains hardware or software or a combination thereof that is customarily used in the art quantitatively to interpret the signals from the sensor.

A water availability input terminal (5) is additionally connected to the measuring unit (4). A level detector or pressure sensor may be connected to the water availability input terminal (5). The measuring unit (4) also possesses hardware or software or a combination thereof customarily used in the art quantitatively to interpret the signals from the level detector or pressure sensor. Since the level detector or pressure sensor is placed in the source of water, the water level or pressure measurement indicates the availability of water in the source. (Because, as explained above, a valve, headgate, or zonal pump regulates the flow of water from the source to the zone associated with a controller, the level detector or pressure sensor placed in the source is positioned upstream from the valve, headgate, or zonal pump.)

The measuring unit (4) is also connected to the logic unit (6) and sends its measurements of zonal conditions and water level or pressure to such logic unit (6). Additionally, the logic unit (6) is connected to the memory (2) as also are the timer (7) and the calculating unit (8).

The logic unit (6) can instigate irrigation either as a result of measured zonal conditions or the arrival of a specified period of time. (Since the logic unit (6) is part of the controller and since the logic unit (6) instigates irrigation, based upon an evaluation by the logic unit (6) of data provided to or generated by such controller, control is accomplished locally by the controller, itself.) The keypad (1) will be operated by the user to store in the memory (2) the guidance whether the logic unit is to commence irrigation based on measured zonal conditions or on the arrival of a specified period of time.

In the case of zonal conditions, the logic unit (6) will compare the measurement for each zonal condition obtained from the measuring unit (4) with the initial zonal threshold value stored in the memory (2) for that zonal condition. Irrigation will be permitted to commence when any zonal threshold value has been reached and sufficient water is available. To determine the sufficiency of available water, the logic unit (6) will either determine whether the measured water level or pressure from the measuring unit (4) has attained the initial water threshold value or whether the measured water pressure from the measuring unit (4) is within the optimum efficiency range at least at the upper end of the dead band. Again the keypad (1) will be utilized by the user to store in the memory (2) the direction as to which determination the logic unit (6) should make. When the logic unit (6) has, thus, decided that irrigation should commence, it sends a signal to the output terminal (9) which is appropriate to cause the actuator for a headgate to open the headgate, to cause a valve to open, or to actuate a zonal pump so that water can flow from the source to the zone associated with the controller. (Again, since the logic unit (6) is part of the controller and since the logic unit (6) sends a signal, based upon an evaluation by the logic unit (6) of data provided to or generated by such controller, to open the headgate, to cause a valve to open, or to actuate a zonal pump so that water can flow from the source to the zone associated with the controller, control is accomplished locally by the controller, itself.)

If desired, the keypad (1) can direct the calculating unit (8) to adjust the initial water threshold value stored in the memory (2) in accordance with the deviation of measured zonal conditions from the initial zonal threshold values; for example, the initial water threshold value could be lowered proportionally to the difference between the measured soil moisture and the initial zonal threshold value for soil moisture.

When irrigation is to commence as a result of the arrival of a specified period of time, the user operates the keypad (1) to enter into the memory (2) the appropriate solar chronological measurements, such as year, month, day, hour, minute, and second as well as the solar chronological periods within which the user wishes to permit irrigation to commence. With the timer (7) connected to the memory (2), the logic unit (6) can determine when the specified period exists and, if—through the process discussed above—it finds sufficient available water to exist, send the signal to the output terminal (9) which will result in the opening of the headgate or valve or the actuation of the zonal pump. (Once more, since the logic unit (6) is part of the controller and since the logic unit (6) sends a signal, based upon an evaluation by the logic unit (6) of data provided to or generated by such controller, to open the headgate, to cause a valve to open, or to actuate a zonal pump so that water can flow from the source to the zone associated with the controller, control is accomplished locally by the controller, itself.)

Similarly, the logic unit (6) can terminate irrigation either as a result of measured zonal conditions or the passage of a specified period of time. The keypad (1) will be utilized by the user to store in the memory (2) the instruction whether the logic unit (6) is to terminate irrigation based on measured zonal conditions or the passage of a specified period of time. (Since the logic unit (6) is part of the controller and since the logic unit (6) can, based upon an evaluation by the logic unit (6) of data provided to or generated by such controller, terminate irrigation either as a result of measured zonal conditions or the passage of a specified period of time, control is accomplished locally by the controller, itself.)

When measured zonal conditions are used, the logic unit (6) will compare the measurement for each zonal condition obtained from the measuring unit (4) with the terminal zonal threshold value stored in the memory (2) for the appropriate zonal condition. When the logic unit (6) has determined that all measured zonal conditions have reached their terminal threshold value, the logic unit (6) sends a signal to the output terminal (9) which is appropriate to cause the actuator for the headgate to close the headgate, to cause the valve to close, or to deactuate the zonal pump so that water can no longer flow from the source to the zone associated with the controller.

To terminate irrigation as a result of the passage of a specified period of time, the user operates the keypad (1) to enter into the memory (2) the desired period of time, i.e., the duration of irrigation. When the logic unit (6) sends a signal to the output terminal (9) that will cause the headgate or valve to open or the zonal pump to actuate, this fact is communicated to the memory (2). With the memory (2) storing the time at which irrigation commenced and also receiving from the timer (7) information as to how much time has passed, the memory (2) provides this data to the logic unit (6), which determines when the specified period of time has passed and then sends a signal to the output terminal (9) which is appropriate to cause the actuator for the headgate to close the headgate, to cause the valve to close, or to deactuate the zonal pump so that water can no longer flow from the source to the zone associated with the controller.

Whether, however, termination of irrigation is to result from measured zonal conditions or the passage of a specified period of time, irrigation will also be terminated whenever water in the source becomes inadequate. To determine the sufficiency of available water, the logic unit (6) will either analyze whether the measured water level or pressure from the measuring unit (4) is below the terminal water threshold value or whether the measured water pressure from the measuring unit (4) is below the optimum efficiency range. If the user has directed that the decision whether sufficient water is available to commence irrigation will be based upon attainment of the initial water threshold value, then the decision to terminate irrigation because of insufficient water will be based upon the failure to maintain at least the terminal water threshold value; however, if the user has specified that the initiation of irrigation will be dependent upon measured water pressure being above the dead band in the optimum pressure range, the decision to terminate irrigation because of insufficient water will be prompted by the measured water pressure falling below the optimum efficiency range. (Since the logic unit (6) is part of the controller and since the logic unit (6) can, based upon an evaluation by the logic unit (6) of data provided to or generated by such controller, terminate irrigation whenever water in the source becomes inadequate, control is accomplished locally by the controller, itself.)

Rather than simply entering a terminal water threshold value into the memory (2), the keypad (1) can be used to instruct the calculating unit (8) to calculate the terminal water threshold value by generating a random number within a range of desirable terminal water threshold values specified through the keypad (1); such value will then be sent by the calculating unit (8) to be stored in the memory (2). Alternatively, the keypad (1) can be utilized to direct the calculating unit (8) to calculate the terminal water threshold value as a value that will be higher as the elapsed time since the controller commenced irrigation—a figure determined by the memory (2) in conjunction with the timer (7) as discussed above—increases. Conversely, the keypad (1) could be operated to instruct the calculating unit (8) to calculate the terminal water threshold value as a value that will be lower as the elapsed time since the controller commenced irrigation increases. And, finally, through the keypad (1) the calculating unit (8) could be directed to calculate the terminal water threshold value in accordance with the formula $$[(H-L)(i-1)/(n-1)]+L$$

where n is the number of controllers in the system, i is a unique controller index number—an integer greater than or equal to 1 and less than or equal to n that is unique to each controller—assigned to the controller, L is the lowest desired terminal water threshold value for any controller in the system, and H is the highest desired terminal water threshold value for any controller in the system.

Alternatively, both duration of time and the attainment of preselected values for measured zonal conditions can be considered by the logic unit (6) in deciding when to terminate irrigation. Irrigation will continue until, through the process discussed above, the logic unit (6) has determined that all measured zonal conditions have reached their terminal threshold values unless, through the time-oriented process related above, the logic unit (6) has earlier determined that the specified period of time has passed and, therefore, terminated irrigation. Once again, the user will operate the keypad (1) to store in the memory (2) the instruction as to which of the methods for terminating irrigation is to be utilized by the logic unit (6).

The multi-zone irrigation controller depicted in FIG. 2 is constructed and operates similarly to the single-zone irrigation controller of FIG. 1 except that zonal input terminals (3) and the output terminal (9) are duplicated for each zone. All values discussed above are entered through the keypad (1) or calculated by the calculating unit (8) separately for each zone and need not be the same for every zone. The logic unit (6) performs its functions separately for each zone and sends the control signals for a given zone to the output terminal (9) associated with that zone.

Figure 3:
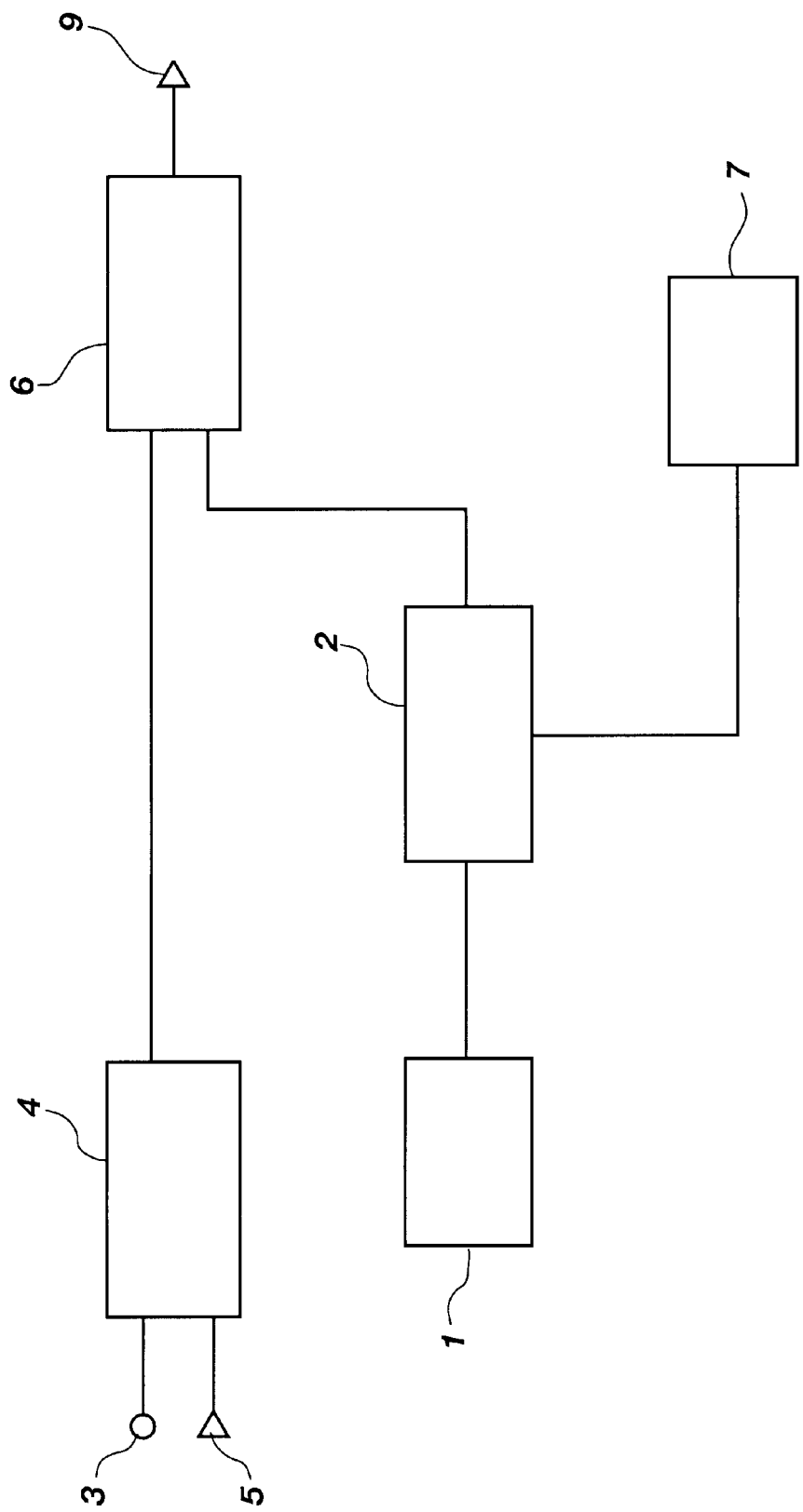
FIG. 3 portrays a single-zone irrigation controller into which is programmed either a discrete terminal water threshold value or an optimum efficiency range, which can cause irrigation to commence either as a result of measured zonal conditions or the arrival of a specified period of time, and which uses either time or measured zonal conditions or a combination of these to determine when irrigation should terminate.
Figure 4:
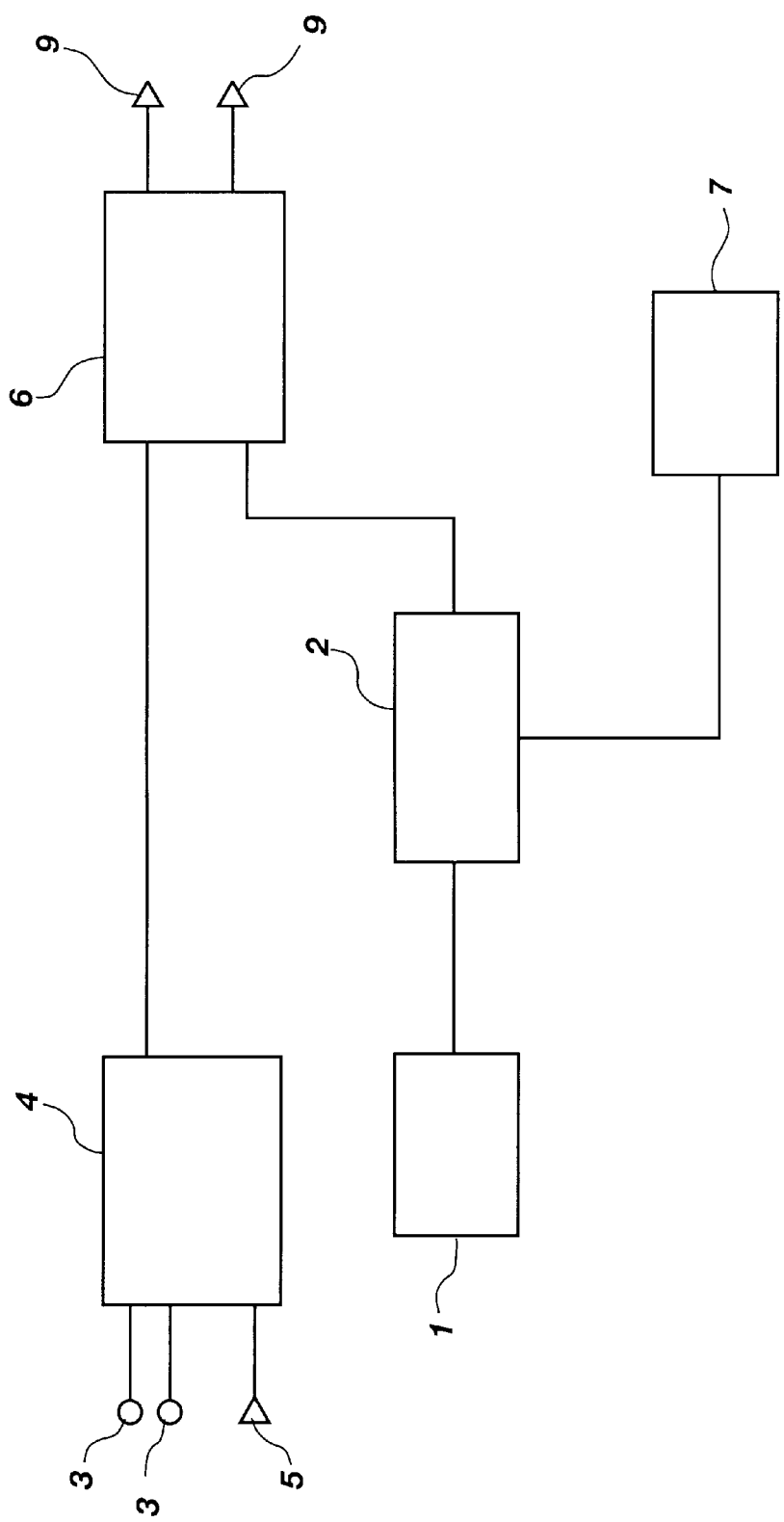
FIG. 4 shows a multi-zone irrigation controller into which are programmed discrete terminal water threshold values or an optimum efficiency range, which can cause irrigation to commence either as a result of measured zonal conditions or the arrival of a specified period of time, and which uses either time or measured zonal conditions or a combination of these to determine when irrigation should terminate.

The embodiment of FIG. 3 is the same as that of FIG. 1 and the embodiment of FIG. 4 is the same as that of FIG. 2 with the exception, in both cases, that the calculating unit (8) has been eliminated. Therefore, operation of the embodiments of FIG. 3 and FIG. 4 is the same as the operation of the embodiments in FIG. 1 and FIG. 2 except that the initial water threshold value can not be adjusted and the terminal water threshold value must be specified, not calculated.

Figure 5:
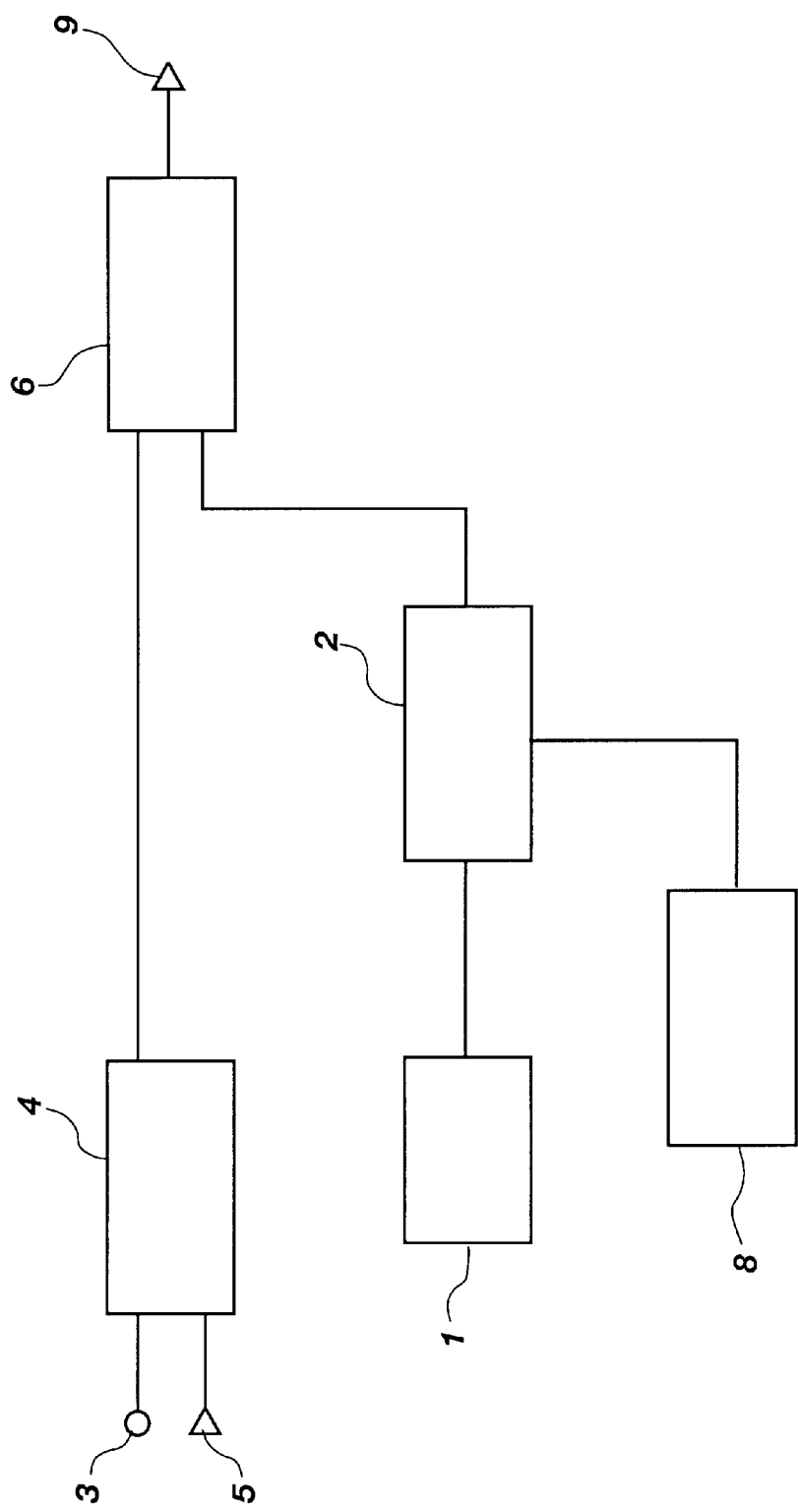
FIG. 5 demonstrates a single-zone irrigation controller into which can be programmed either a discrete terminal water threshold value or an optimum efficiency range or which can calculate its own terminal water threshold value and which uses measured zonal conditions to determine both when irrigation should commence and when it should terminate.
Figure 6:
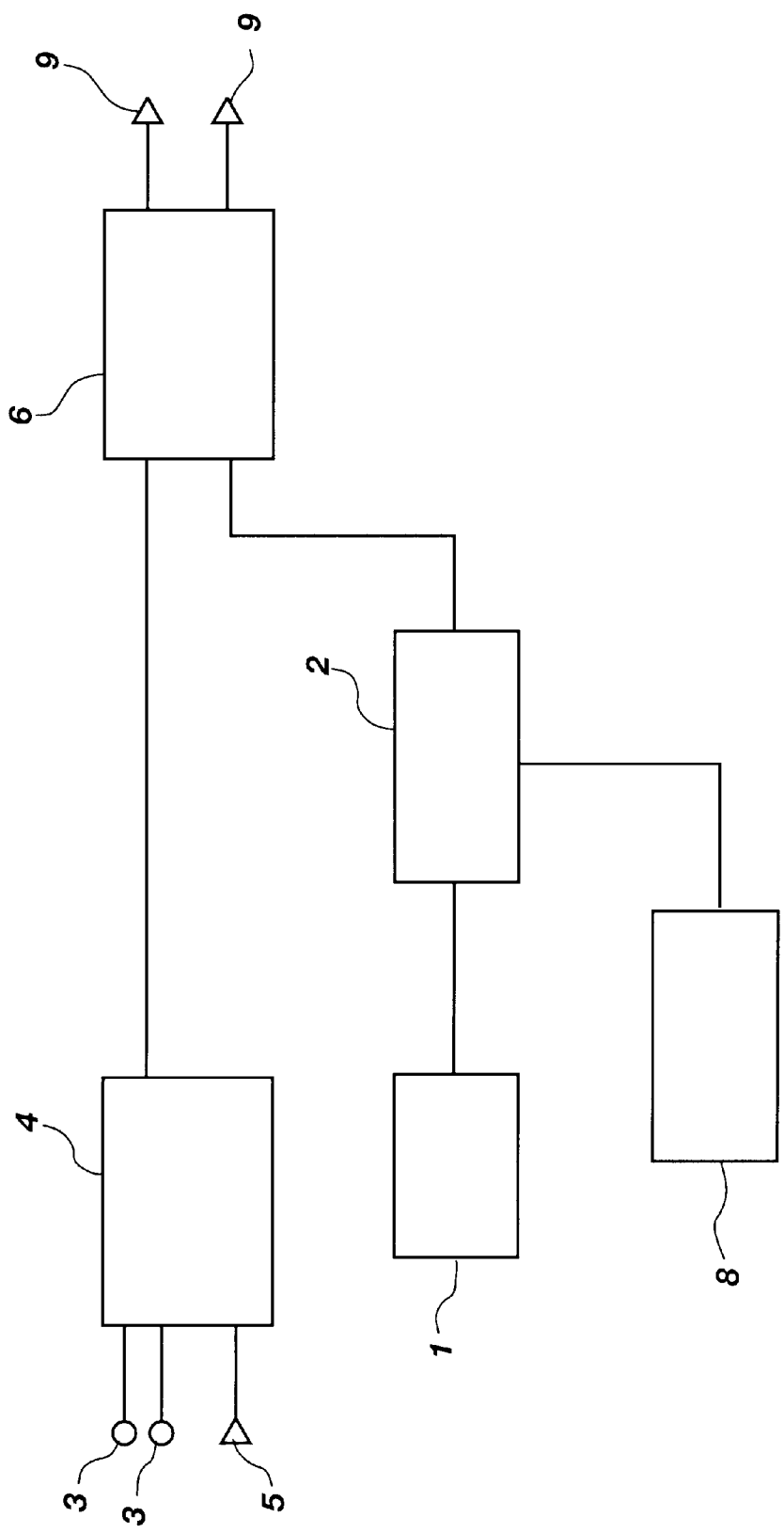
FIG. 6 portrays a multi-zone irrigation controller into which can be programmed discrete terminal water threshold values or an optimum efficiency range or which can calculate its own terminal water threshold value and which uses measured zonal conditions to determine both when irrigation should commence and when it should terminate.

Similarly, the embodiment of FIG. 5 is the same as that of FIG. 1 and the embodiment of FIG. 6 is the same as that of FIG. 2 with the exception, in both cases, that the timer (7) has been eliminated. Thus, operation of the embodiments of FIG. 5 and FIG. 6 is the same as the operation of the embodiments in FIG. 1 and FIG. 2 except that irrigation may not be commenced as a result of the arrival of a specified period of time or terminated when a specified period of time has passed. And the keypad (1) need not be used to direct that commencement and termination of irrigation be based on measured zonal conditions. Of course, the terminal water threshold values can be calculated but not based on the elapsed time of irrigation.

Figure 7:
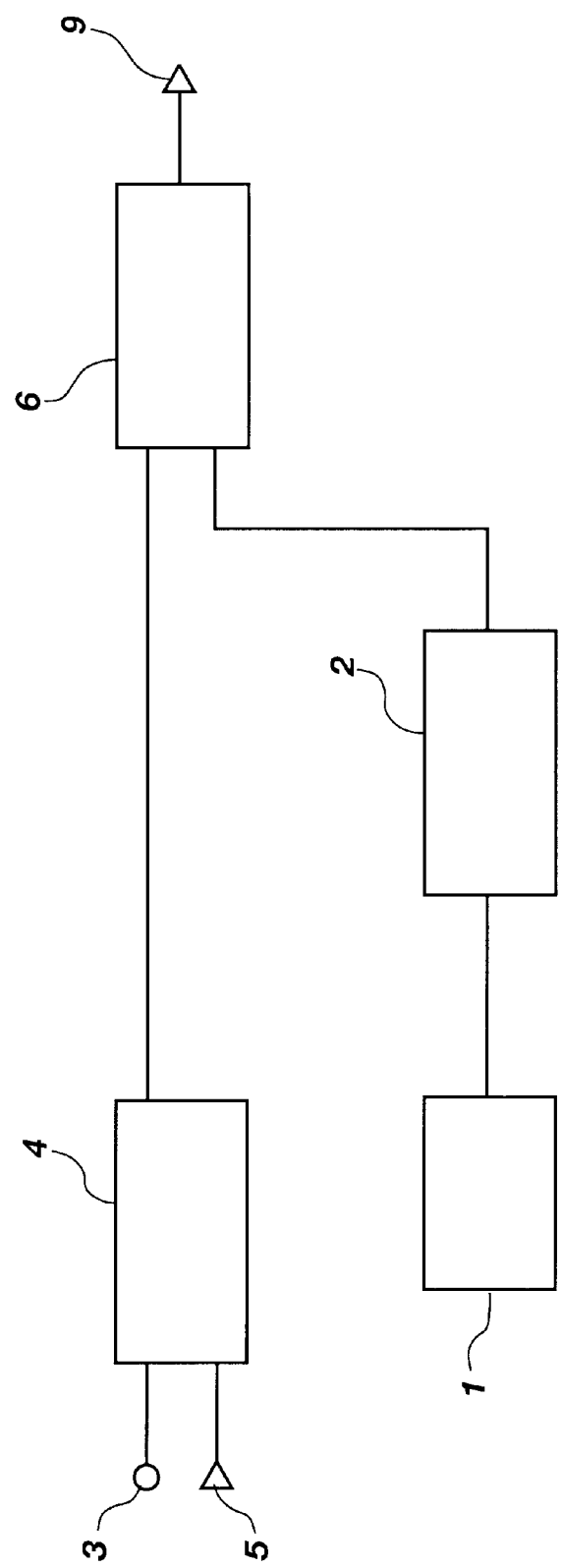
FIG. 7 depicts a single-zone irrigation controller into which is programmed either a discrete terminal water threshold value or an optimum efficiency range, which causes irrigation to commence on the basis of measured zonal conditions, and which uses measured zonal conditions to determine when irrigation should terminate.
Figure 8:
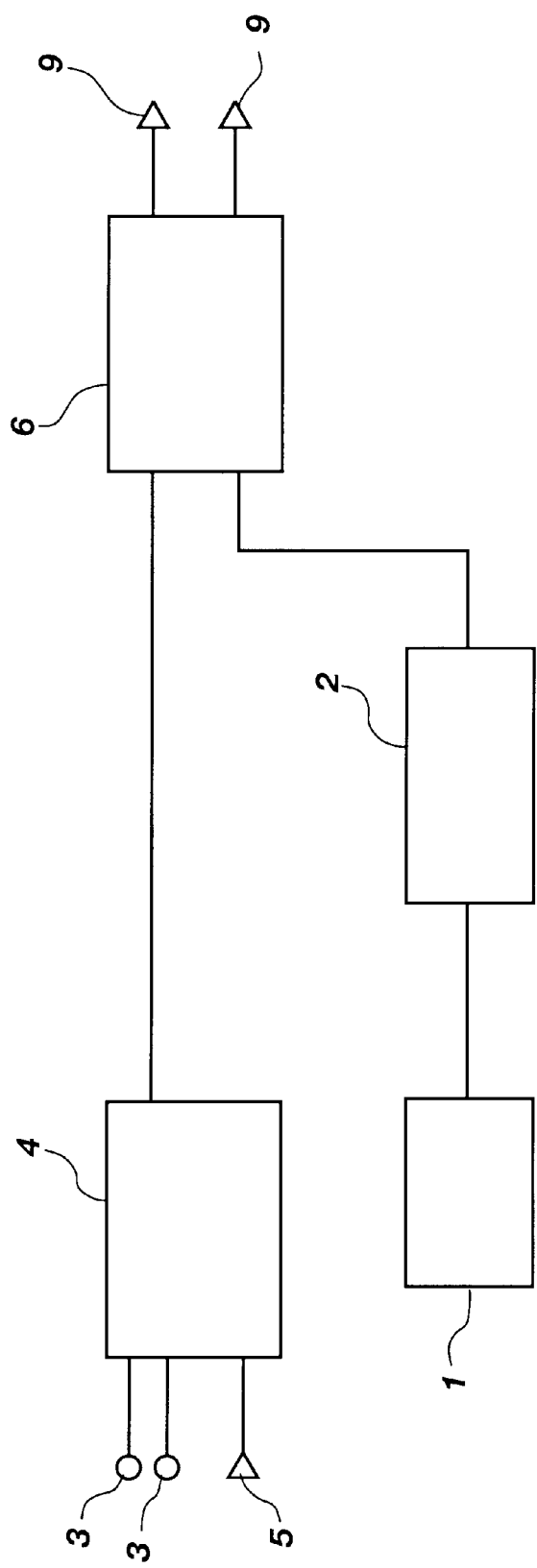
FIG. 8 illustrates a multi-zone irrigation controller into which are programmed discrete terminal water threshold values or an optimum efficiency range, which causes irrigation to commence on the basis of measured zonal conditions, and which uses measured zonal conditions to determine when irrigation should terminate.

Likewise, the embodiment of FIG. 7 is the same as that of FIG. 1 and the embodiment of FIG. 8 is the same as that of FIG. 2 with the exceptions, in both cases, that the timer (7) and the calculating unit (8) have been eliminated. Hence, operation of the embodiments of FIG. 7 and FIG. 8 is the same as the operation of the embodiments in FIG. 1 and FIG. 2 with all the qualifications enumerated for FIG. 3, FIG. 4, FIG. 5, and FIG. 6. This means the terminal water threshold values must be entered through the keypad (1) and the commencement as well as the termination of irrigation will be based on measured zonal conditions.

Figure 9:
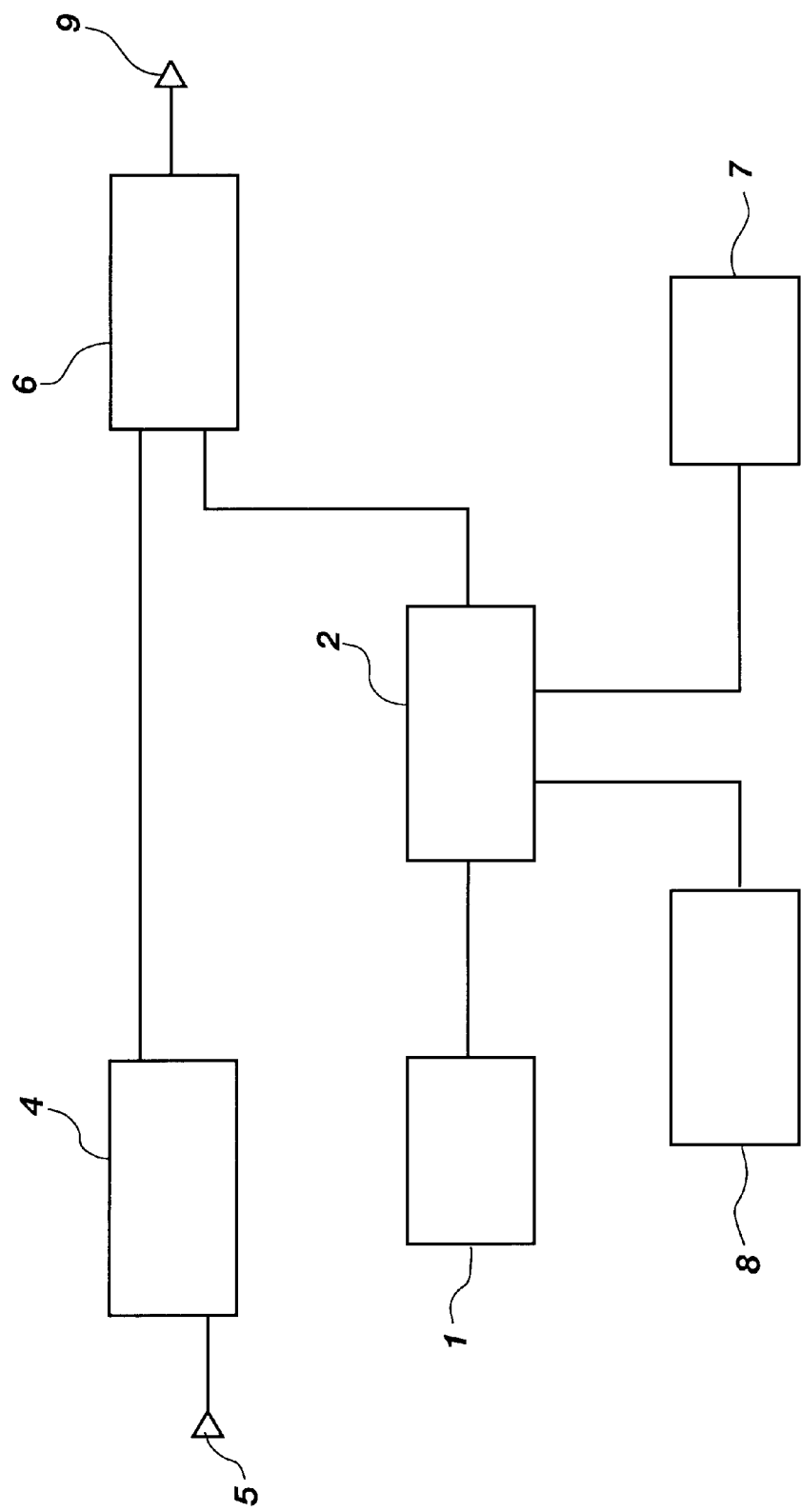
FIG. 9 shows a single-zone irrigation controller into which can be programmed either a discrete terminal water threshold value or an optimum efficiency range or which can calculate its own terminal water threshold value based upon the elapsed time of irrigation or otherwise, which causes irrigation to commence as a result of the arrival of a specified period of time, and which uses a timer to determine when irrigation should terminate.
Figure 10:
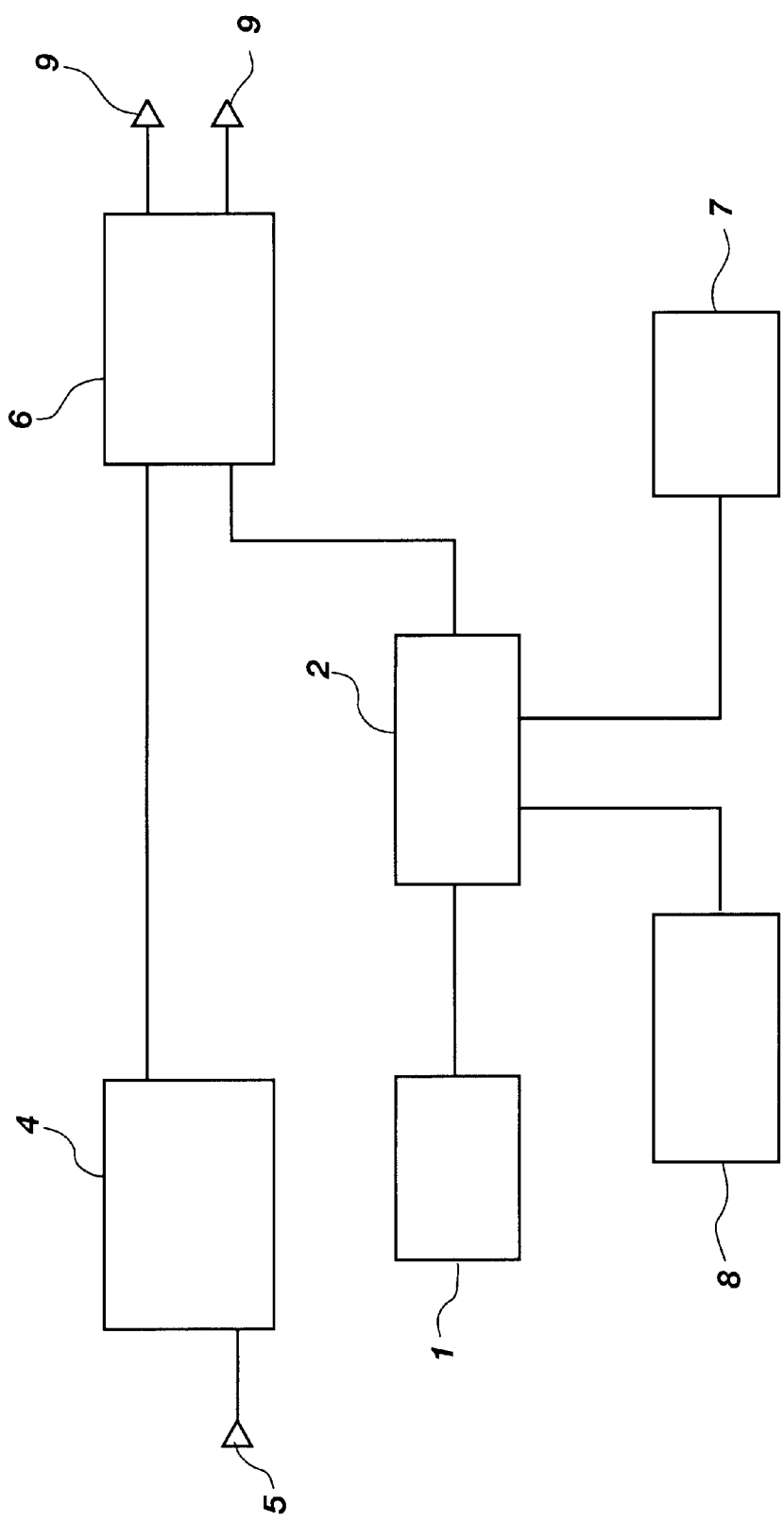
FIG. 10 depicts a multi-zone irrigation controller into which can be programmed either discrete terminal water threshold values or an optimum efficiency range or which can calculate its own terminal water threshold values based upon the elapsed time of irrigation or otherwise, which causes irrigation to commence as a result of the arrival of a specified period of time, and which uses a timer to determine when irrigation should terminate.

The embodiment of FIG. 9 is the same as that of FIG. 1 and the embodiment of FIG. 10 is the same as that of FIG. 2 with the exceptions, in both cases, that the zonal input terminals (3) have been eliminated. Consequently, operation of the embodiments of FIG. 9 and FIG. 10 is the same as the operation of the embodiments in FIG. 1 and FIG. 2 except that irrigation may not be commenced or terminated based on measured zonal conditions; the initial water threshold cannot be adjusted in accordance with the deviation of measured zonal conditions from the initial zonal threshold values; the initial zonal threshold values need not be entered through the keypad (1); and the keypad (1) need not be used to instruct that commencement of irrigation will be based on the arrival of a specified period of time and termination, on the passage of a specified duration of time. If there is sufficient water available in the source, irrigation will automatically commence and terminate on the basis of time.

Figure 11:
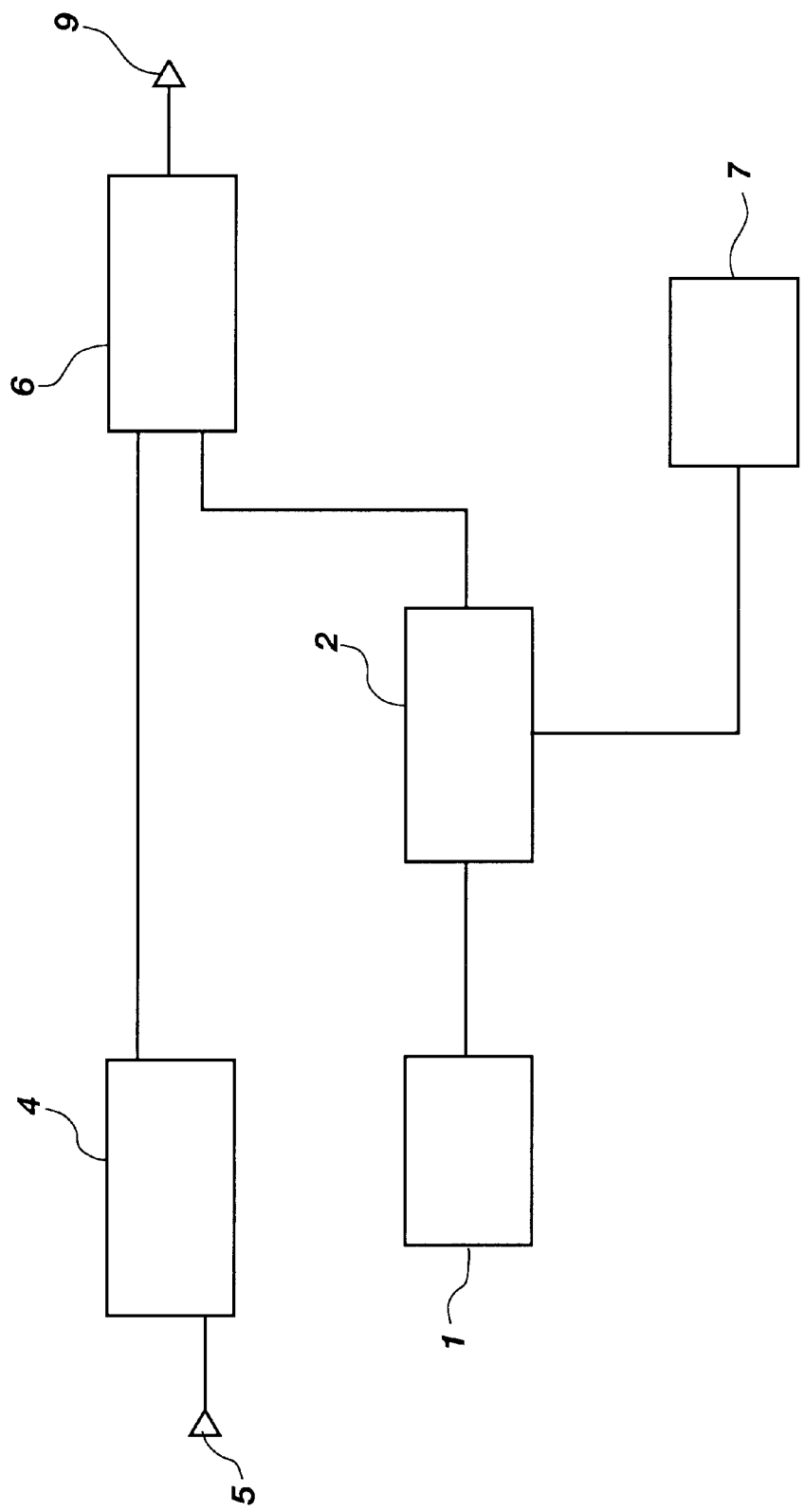
FIG. 11 demonstrates a single-zone irrigation controller into which is programmed either a discrete terminal water threshold value or an optimum efficiency range, which causes irrigation to commence as a result of the arrival of a specified period of time, and which uses a timer to determine when irrigation should terminate.
Figure 12:
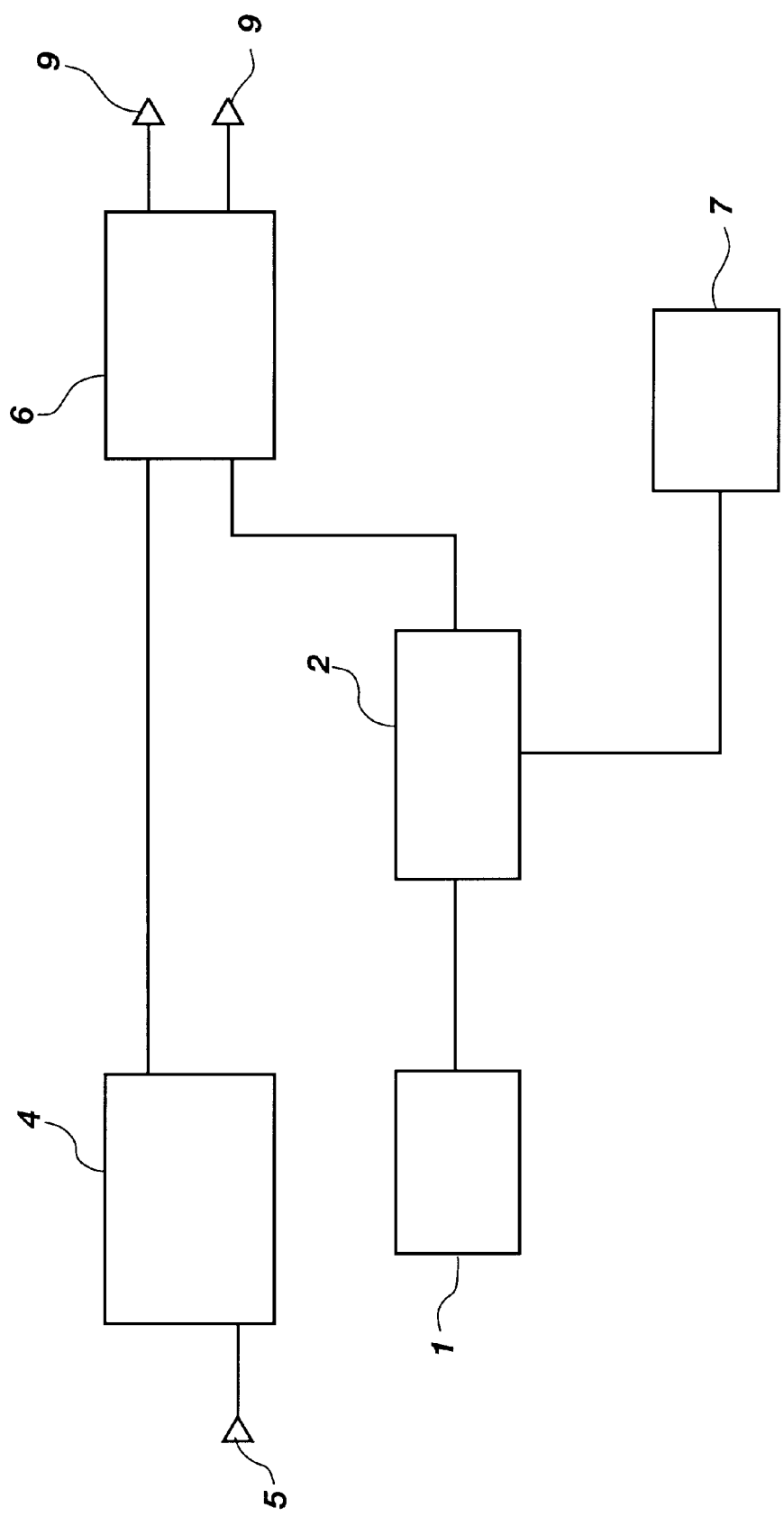
FIG. 12 portrays a multi-zone irrigation controller into which are programmed discrete terminal water threshold values or an optimum efficiency range, which causes irrigation to commence as a result of the arrival of a specified period of time, and which uses a timer to determine when irrigation should terminate.

Finally, the embodiment of FIG. 11 is the same as that of FIG. 3 and the embodiment of FIG. 12 is the same as that of FIG. 4 with the exception, in both cases, that the zonal input terminals (3) have been eliminated. Operation of the embodiments of FIG. 11 and FIG. 12 is, therefore, the same as the operation of the embodiments in FIG. 1 and FIG. 2 with all the qualifications enumerated for FIG. 3, FIG. 4, FIG. 9, and FIG. 10. Consequently, water threshold values or an optimum efficiency range must be entered through the keypad (1) and, if sufficient water is available, irrigation will commence as a result of the arrival of a specified period of time and terminate after the passage of a specified duration of time.

I claim:

1. A single-zone irrigation controller for neural networking with at least one other such single-zone or multi-zone irrigation controller, which comprises:

a means for measuring at least one zonal condition;

a means for setting the initial zonal threshold value for each measured zonal condition, setting the initial water threshold value, and setting the chronological duration of irrigation;

a means for measuring the availability of water in a common source, said water availability measuring means being positioned upstream from a valve, headgate, or zonal pump which controls the flow of water from the source into the zone;

a means for determining the chronological length of irrigation, which is connected to the duration and value setting means; and a means for directing the valve, headgate, or zonal pump which controls the flow of water from the source into the zone to open or, in the case of the zonal pump, actuate when any initial zonal threshold value has been reached and the initial water threshold value for the zone has been attained, and for directing the valve, headgate, or zonal pump which controls the flow of water from the source into the zone to close or, in the case of the zonal pump, deactuate when a chronological duration which has been set by a user or a manufacturer of the irrigation controller has transpired, which means for directing the valve, headgate, or zonal pump to open or close or to actuate or deactuate is connected to the zonal condition measuring means, the duration and value setting means, the water availability measuring means, and the means for determining the chronological length of irrigation.

2. A single-zone irrigation controller for neural networking with at least one other such single-zone or multi-zone irrigation controller, which comprises:

a means for measuring at least one zonal condition;

a means for setting the initial zonal threshold value for each measured zonal condition, setting the initial water threshold value, and setting the terminal zonal threshold value for each measured zonal condition;

a means for measuring the availability of water in a common source, said water availability measuring means being positioned upstream from a valve, headgate, or zonal pump which controls the flow of water from the source into the zone; and a means for directing the valve, headgate, or zonal pump which controls the flow of water from the source into the zone to open or, in the case of the zonal pump, actuate when any initial zonal threshold value has been reached and the initial water threshold value for the zone has been attained, and for directing the valve, headgate, or zonal pump which controls the flow of water from the source into the zone to close or, in the case of the zonal pump, deactuate when all terminal zonal threshold values have been reached, which means for directing the valve, headgate, or zonal pump to open or close or to actuate or deactuate is connected to the zonal condition measuring means, the value setting means, and the water availability measuring means.

3. A multi-zone irrigation controller for neural networking with at least one other such multi-zone or single-zone irrigation controller, which comprises:

a means for measuring at least one zonal condition for each zone associated with the multi-zone irrigation controller;

a means for setting the initial zonal threshold value for each measured zonal condition, setting the initial water threshold value for each zone associated with the multi-zone irrigation controller, and setting the chronological duration of irrigation for each zone associated with the multi-zone irrigation controller;

a means for measuring the availability of water in a common source, said water availability measuring means being positioned upstream from valves, headgates, or zonal pumps which control the flow of water from the source into the zones associated with the multi-zone irrigation controller;

a means for determining the chronological length of irrigation for each zone associated with the multi-zone irrigation controller, which means for determining the chronological length is connected to the duration and value setting means; and a means for directing a valve, headgate, or zonal pump which controls the flow of water from the source into a given zone associated with the multi-zone irrigation controller to open or, in the case of the zonal pump, actuate when any initial zonal threshold value of the given zone has been reached and the initial water threshold value for the given zone has been attained, and for directing the valve, headgate, or zonal pump which controls the flow of water from the source into a given zone associated with the multi-zone irrigation controller to close or, in the case of the zonal pump, deactuate when a chronological duration which has been set by a user or a manufacturer of the irrigation controller for that zone has transpired, which means for directing the valve, headgate, or zonal pump to open or close or to actuate or deactuate is connected to the zonal condition measuring means, the duration and value setting means, the water availability measuring means, and the means for determining the chronological length of irrigation.

4. A multi-zone irrigation controller for neural networking with at least one other such multi-zone or single-zone irrigation controller, which comprises:

a means for measuring at least one zonal condition for each zone associated with the multi-zone irrigation controller;

a means for setting the initial zonal threshold value for each measured zonal condition, setting the initial water threshold value for each zone associated with the multi-zone irrigation controller, and setting the terminal zonal threshold value for each measured zonal condition;

a means for measuring the availability of water in a common source, said water availability measuring means being positioned upstream from valves, headgates, or zonal pumps which control the flow of water from the source into the zones associated with the multi-zone irrigation controller; and a means for directing a valve, headgate, or zonal pump which controls the flow of water from the source into a given zone associated with the multi-zone irrigation controller to open or, in the case of the zonal pump, actuate when any initial zonal threshold value of the given zone has been reached and the initial water threshold value for the given zone has been attained, and for directing the valve, headgate, or zonal pump which controls the flow of water from the source into a given zone associated with the multi-zone irrigation controller to close or, in the case of the zonal pump, deactuate when all terminal zonal threshold values for that zone have been reached, which means for directing the valve, headgate, or zonal pump to open or close or to actuate or deactuate is connected to the zonal condition measuring means, the value setting means, and the water availability measuring means.

5. A single-zone irrigation controller which is programmed with the optimum efficiency range for a pump supplying water to a main-line pipe of a pressurized irrigation system and which is for neural networking with at least one other such similarly programmed single-zone or multi-zone irrigation controller, which comprises:

a means for measuring at least one zonal condition;

a means for setting the initial zonal threshold value for each measured zonal condition, programming into said single-zone irrigation controller the optimum efficiency range for the pump that supplies water to the main-line pipe, and setting the chronological duration of irrigation;

a means for measuring the water pressure in the main-line pipe, said water pressure measuring means being positioned upstream from a valve which controls the flow of water from the main-line pipe into the zone;

a means for determining the chronological length of irrigation, which is connected to the duration and value setting and programming means; and a means for directing the valve which controls the flow of water from the main-line pipe into the zone to open when any initial zonal threshold value has been reached and the water pressure in the main-line pipe is within the optimum efficiency range for the pump that supplies water to the main-line pipe, and for directing the valve which controls the flow of water from the main-line pipe into the zone to close when a chronological duration which has been set by a user or a manufacturer of the irrigation controller has transpired, which means for directing the valve to open or close is connected to the zonal condition measuring means, the duration and value setting and programming means, the water pressure measuring means, and the means for determining the chronological length of irrigation.

6. A single-zone irrigation controller which is programmed with the optimum efficiency range for a pump supplying water to a main-line pipe of a pressurized irrigation system and which is for neural networking with at least one other such similarly programmed single-zone or multi-zone irrigation controller, which comprises:

a means for measuring at least one zonal condition;

a means for setting the initial zonal threshold value for each measured zonal condition, programming into said single-zone irrigation controller the optimum efficiency range for the pump that supplies water to the main-line pipe, and setting the terminal zonal threshold value for each measure zonal condition;

a means for measuring the water pressure in the main-line pipe, said water pressure measuring means being positioned upstream from a valve which controls the flow of water from the main-line pipe into the zone; and a means for directing the valve which controls the flow of water from the main-line pipe into the zone to open when any initial zonal threshold value has been reached and the water pressure in the main-line pipe is within the optimum efficiency range for the pump that supplies water to the main-line pipe, and for directing the valve which controls the flow of water from the main-line pipe into the zone to close when all terminal zonal threshold values have been reached, which means for directing the valve to open or close is connected to the zonal condition measuring means, the value setting and programming means, and the water pressure measuring means.

7. A multi-zone irrigation controller which is programmed with the optimum efficiency range for a pump supplying water to a main-line pipe of a pressurized irrigation system and which is for neural networking with at least one other such similarly programmed multi-zone or single-zone irrigation controller, which comprises:

- a means for measuring at least one zonal condition for each zone associated with the multi-zone irrigation controller;
- a means for setting the initial zonal threshold value for each measured zonal condition, programming into said multi-zone irrigation controller the optimum efficiency range for the pump that supplies water to the main-line pipe, and setting the chronological duration of irrigation for each zone associated with the multi-zone irrigation controller;
- a means for measuring the water pressure in the main-line pipe, said water pressure measuring means being positioned upstream from valves which control the flow of water from the main-line pipe into the zones associated with the multi-zone irrigation controller;
- a means for determining the chronological length of irrigation for each zone associated with the multi-zone irrigation controller, which means for determining the chronological length of irrigation is connected to the duration and value setting and programming means; and
- a means for directing a valve which controls the flow of water from the main-line pipe into a given zone associated with the multi-zone irrigation controller to open when any initial zonal threshold value of the given zone has been reached and the water pressure in the main-line pipe is within the optimum efficiency range for the pump that supplies water to the main-line pipe, and for directing the valve which controls the flow of water from the main-line pipe into a given zone associated with the multi-zone irrigation controller to close when a chronological duration for that zone which has been set by a user or a manufacturer of the irrigation controller has transpired, which means for directing the valve to open or close is connected to the zonal condition measuring means, the duration and value setting and programming means, the water pressure measuring means, and the means for determining the chronological length of irrigation.

8. A multi-zone irrigation controller which is programmed with the optimum efficiency range for a pump supplying water to a main-line pipe of a pressurized irrigation system and which is for neural networking with at least one other such similarly programmed multi-zone or single-zone irrigation controller, which comprises:

- a means for measuring at least one zonal condition for each zone associated with the multi-zone irrigation controller;
- a means for setting the initial zonal threshold value for each measured zonal condition, programming into said multi-zone irrigation controller the optimum efficiency range for the pump that supplies water to the main-line pipe, and setting the terminal zonal threshold value for each measure zonal condition;
- a means for measuring the water pressure in the main-line pipe, said water pressure measuring means being positioned upstream from valves which control the flow of water from the main-line pipe into the zones associated with the multi-zone irrigation controller; and
- a means for directing a valve which controls the flow of water from the main-line pipe into a given zone associated with the multi-zone irrigation controller to open when any initial zonal threshold value of the given zone has been reached and the water pressure in the main-line pipe is within the optimum efficiency range for the pump that supplies water to the main-line pipe, and for directing the valve which controls the flow of water from the main-line pipe into a given zone associated with the multi-zone irrigation controller to close when all terminal zonal threshold values for that zone have been reached, which means for directing the valve to open or close is connected to the zonal condition measuring means, the value setting and programming means, and the water pressure measuring means.

9. A single-zone irrigation controller for neural networking with at least one other such single-zone or multi-zone irrigation controller, which comprises:

- a means for measuring the availability of water in a common source, said water availability measuring means being positioned upstream from a valve, headgate, or zonal pump which controls the flow of water from the source into the zone;
- a means for setting the initial water threshold value, setting periods of time within which irrigation may commence, and setting the chronological duration of irrigation;
- a means for determining the time;
- a means for determining the chronological length of irrigation, which is connected to the means for setting periods and duration and value; and
- a means for directing the valve, headgate, or zonal pump which controls the flow of water from the source into the zone to open or, in the case of the zonal pump, actuate when the time is within a period during which irrigation may commence and the initial water threshold value for the zone has been attained, and for directing the valve, headgate, or zonal pump which controls the flow of water from the source into the zone to close or, in the case of the zonal pump, deactivate when a chronological duration for that zone which has been set by a user or a manufacturer of the irrigation controller has transpired, which means for directing the valve, headgate, or zonal pump to open or close or to actuate or deactuate is connected to the water availability measuring means, the means for setting periods and duration and value, the means for determining the time, and the means for determining the chronological length of irrigation.

10. A multi-zone irrigation controller for neural networking with at least one other such multi-zone or single-zone irrigation controller, which comprises:

- a means for measuring the availability of water in a common source, said water availability measuring means being positioned upstream from valves, headgates, or zonal pumps which control the flow of water from the source into the zones associated with the multi-zone irrigation controller;
- a means for setting the initial water threshold value for each zone associated with the multi-zone irrigation controller, setting periods of time for each zone associated with the multi-zone irrigation controller within which irrigation of the zone may commence, and setting the chronological duration of irrigation for each zone associated with the multi-zone irrigation controller;

a means for determining the time;

a means for determining the chronological length of irrigation for each zone associated with the multi-zone irrigation controller, which means for determining the chronological length is connected to the means for setting periods and duration and value; and a means for directing a valve, headgate, or zonal pump which controls the flow of water from the source into a given zone associated with the multi-zone irrigation controller to open or, in the case of the zonal pump, actuate when the time is within a period during which irrigation may commence in the given zone and the initial water threshold value for the given zone has been attained, and for directing the valve, headgate, or zonal pump which controls the flow of water from the source into a given zone associated with the multi-zone irrigation controller to close or, in the case of the zonal pump, deactuate when a chronological duration which has been set by a user or a manufacturer of the irrigation controller for that zone has transpired, which means for directing the valve, headgate, or zonal pump to open or close or to actuate or deactuate is connected to the water availability measuring means, the means for setting periods and duration and value, the means for determining the time, and the means for determining the chronological length of irrigation.

11. A single-zone irrigation controller which is programmed with the optimum efficiency range for a pump supplying water to a main-line pipe of a pressurized irrigation system and which is for neural networking with at least one other such similarly programmed single-zone or multi-zone irrigation controller, which comprises:

a means for measuring the water pressure in the main-line pipe, said water pressure measuring means being positioned upstream from a valve which controls the flow of water from the main-line pipe into the zone;

a means for programming into said single-zone irrigation controller the optimum efficiency range for the pump that supplies water to the main-line pipe, setting periods of time within which irrigation may commence, and setting the chronological duration of irrigation;

a means for determining the time;

a means for determining the chronological length of irrigation, which is connected to the means for setting periods and duration and programming; and a means for directing the valve which controls the flow of water from the main-line pipe into the zone to open when the time is within a period during which irrigation may commence and the water pressure in the main-line pipe is within the optimum efficiency range for the pump that supplies water to the main-line pipe, and for directing the valve which controls the flow of water from the main-line pipe into the zone to close when a chronological duration which has been set by a user or a manufacturer of the irrigation controller has transpired, which means for directing the valve to open or close is connected to the water pressure measuring means, the means for setting periods and duration and programming, the means for determining the time, and the means for determining the chronological length of irrigation.

12. A multi-zone irrigation controller which is programmed with the optimum efficiency range for a pump supplying water to a main-line pipe of a pressurized irrigation system and which is for neural networking with at least one other such similarly programmed multi-zone or single-zone irrigation controller, which comprises:

a means for measuring the water pressure in the main-line pipe, said water pressure measuring means being positioned upstream from valves which control the flow of water from the main-line pipe into the zones associated with the multi-zone irrigation controller;

a means for programming into said multi-zone irrigation controller the optimum efficiency range for the pump that supplies water to the main-line pipe, setting periods of time for each zone associated with the multi-zone irrigation controller within which irrigation of the zone may commence, and setting the chronological duration of irrigation for each zone associated with the multi-zone irrigation controller;

a means for determining the time;

a means for determining the chronological length of irrigation for each zone associated with the multi-zone irrigation controller, which means for determining the chronological length is connected to the means for setting periods and duration and programming; and a means for directing a valve which controls the flow of water from the main-line pipe into a given zone associated with the multi-zone irrigation controller to open when the time is within a period during which irrigation may commence in the given zone and the water pressure in the main-line pipe is within the optimum efficiency range for the pump that supplies water to the main-line pipe, and for directing the valve which controls the flow of water from the main-line pipe into a given zone associated with the multi-zone irrigation controller to close when a chronological duration which has been set by a user or a manufacturer of the irrigation controller has transpired, which means for directing the valve to open or close is connected to the water pressure measuring means, the means for setting periods and duration and programming, the means for determining the time, and the means for determining the chronological length of irrigation.

13. A single-zone irrigation controller for neural networking with at least one other such single-zone or multi-zone irrigation controller, which comprises:

a means for measuring at least one zonal condition;

a means for setting the initial zonal threshold value for each measured zonal condition, setting the water threshold values, and setting the chronological duration of irrigation;

a means for measuring the availability of water in a common source, said water availability measuring means being positioned upstream from a valve, headgate, or zonal pump which controls the flow of water from the source into the zone;

a means for determining the chronological length of irrigation, which is connected to the duration and value setting means; and a means for directing the valve, headgate, or zonal pump which controls the flow of water from the source into the zone to open or, in the case of the zonal pump, actuate when any initial zonal threshold value has been reached and the initial water threshold value for the zone has been attained, and for directing the valve, headgate, or zonal pump which controls the flow of water from the source into the zone to close or, in the case of the zonal pump, deactivate when either a chronological duration which has been set by a user or a manufacturer of the irrigation controller has transpired or the measurement of water in the source has fallen below the terminal water threshold value for the zone, which means for directing the valve, headgate, or zonal pump to open or close or to actuate or deactuate is connected to the zonal condition measuring means, the duration and value setting means, the water availability measuring means, and the means for determining the chronological length of irrigation.

14. A single-zone irrigation controller for neural networking with at least one other such single-zone or multi-zone irrigation controller, which comprises:

a means for measuring at least one zonal condition;

a means for setting the initial zonal threshold value for each measured zonal condition, setting the water threshold values, and setting the terminal zonal threshold value for each measured zonal condition;

a means for measuring the availability of water in a common source, said water availability measuring means being positioned upstream from a valve, headgate, or zonal pump which controls the flow of water from the source into the zone; and a means for directing the valve, headgate, or zonal pump which controls the flow of water from the source into the zone to open or, in the case of the zonal pump, actuate when any initial zonal threshold value has been reached and the initial water threshold value for the zone has been attained, and for directing the valve, headgate, or zonal pump which controls the flow of water from the source into the zone to close or, in the case of the zonal pump, deactuate when either all terminal zonal threshold values have been reached or the measurement of water in the source has fallen below the terminal water threshold value for the zone, which means for directing the valve, headgate, or zonal pump to open or close or to actuate or deactuate is connected to the zonal condition measuring means, the value setting means, and the water availability measuring means.

15. A multi-zone irrigation controller for neural networking with at least one other such multi-zone or single-zone irrigation controller, which comprises:

a means for measuring at least one zonal condition for each zone associated with the multi-zone irrigation controller;

a means for setting the initial zonal threshold value for each measured zonal condition, setting the water threshold values for each zone associated with the multi-zone irrigation controller, and setting the chronological duration of irrigation for each zone associated with the multi-zone irrigation controller;

a means for measuring the availability of water in a common source, said water availability measuring means being positioned upstream from valves, headgates, or zonal pumps which control the flow of water from the source into the zones associated with the multi-zone irrigation controller;

a means for determining the chronological length of irrigation for each zone associated with the multi-zone irrigation controller, which means for determining the chronological length is connected to the duration and value setting means; and a means for directing a valve, headgate, or zonal pump which controls the flow of water from the source into a given zone associated with the multi-zone irrigation controller to open or, in the case of the zonal pump, actuate when any initial zonal threshold value of the given zone has been reached and the initial water threshold value for the given zone has been attained, and for directing the valve, headgate, or zonal pump which controls the flow of water from the source into a given zone associated with the multi-zone irrigation controller to close or, in the case of the zonal pump, deactuate when either a chronological duration which has been set by a user or a manufacturer of the irrigation controller for that zone has transpired or the measurement of water in the source has fallen below the terminal water threshold value for that zone, which means for directing the valve, headgate, or zonal pump to open or close or to actuate or deactuate is connected to the zonal condition measuring means, the duration and value setting means, the water availability measuring means, and the means for determining the chronological length of irrigation.

16. A multi-zone irrigation controller for neural networking with at least one other such multi-zone or single-zone irrigation controller, which comprises:

a means for measuring at least one zonal condition for each zone associated with the multi-zone irrigation controller;

a means for setting the initial zonal threshold value for each measured zonal condition, setting the water threshold values for each zone associated with the multi-zone irrigation controller, and setting the terminal zonal threshold value for each measured zonal condition;

a means for measuring the availability of water in a common source, said water availability measuring means being positioned upstream from valves, headgates, or zonal pumps which control the flow of water from the source into the zones associated with the multi-zone irrigation controller; and a means for directing a valve, headgate, or zonal pump which controls the flow of water from the source into a given zone associated with the multi-zone irrigation controller to open or, in the case of the zonal pump, actuate when any initial zonal threshold value of the given zone has been reached and the initial water threshold value for the given zone has been attained, and for directing the valve, headgate, or zonal pump which controls the flow of water from the source into a given zone associated with the multi-zone irrigation controller to close or, in the case of the zonal pump, deactuate when either all terminal zonal threshold values for that zone have been reached or the measurement of water in the source has fallen below the terminal water threshold value for that zone, which means for directing the valve, headgate, or zonal pump to open or close or to actuate or deactuate is connected to the zonal condition measuring means, the value setting means, and the water availability measuring means.

17. A single-zone irrigation controller which is programmed with the optimum efficiency range for a pump supplying water to a main-line pipe of a pressurized irrigation system and which is for neural networking with at least one other such similarly programmed single-zone or multi-zone irrigation controller, which comprises:

a means for measuring at least one zonal condition;

a means for setting the initial zonal threshold value for each measured zonal condition, programming into said single-zone irrigation controller the optimum efficiency range for the pump that supplies water to the main-line pipe, and setting the chronological duration of irrigation;

a means for measuring the water pressure in the main-line pipe, said water pressure measuring means being positioned upstream from a valve which controls the flow of water from the main-line pipe into the zone;

a means for determining the chronological length of irrigation, which is connected to the duration and value setting and programming means; and a means for directing the valve which controls the flow of water from the main-line pipe into the zone to open when any initial zonal threshold value has been reached and the water pressure in the main-line pipe is within the optimum efficiency range for the pump that supplies water to the main-line pipe, and for directing the valve which controls the flow of water from the main-line pipe into the zone to close when either a chronological duration which has been set by a user or a manufacturer of the irrigation controller has transpired or the water pressure in the main-line pipe has fallen below the optimum efficiency range, which means for directing the valve to open or close is connected to the zonal condition measuring means, the duration and value setting and programming means, the water pressure measuring means, and the means for determining the chronological length of irrigation.

18. A single-zone irrigation controller which is programmed with the optimum efficiency range for a pump supplying water to a main-line pipe of a pressurized irrigation system and which is for neural networking with at least one other such similarly programmed single-zone or multi-zone irrigation controller, which comprises:

a means for measuring at least one zonal condition;

a means for setting the initial zonal threshold value for each measured zonal condition, programming into said single-zone irrigation controller the optimum efficiency range for the pump that supplies water to the main-line pipe, and setting the terminal zonal threshold value for each measure zonal condition;

a means for measuring the water pressure in the main-line pipe, said water pressure measuring means being positioned upstream from a valve which controls the flow of water from the main-line pipe into the zone; and a means for directing the valve which controls the flow of water from the main-line pipe into the zone to open when any initial zonal threshold value has been reached and the water pressure in the main-line pipe is within the optimum efficiency range for the pump that supplies water to the main-line pipe, and for directing the valve which controls the flow of water from the main-line pipe into the zone to close when either all terminal zonal threshold values have been reached or the water pressure in the main-line pipe has fallen below the optimum efficiency range, which means for directing the valve to open or close is connected to the zonal condition measuring means, the value setting and programming means, and the water pressure measuring means.

19. A multi-zone irrigation controller which is programmed with the optimum efficiency range for a pump supplying water to a main-line pipe of a pressurized irrigation system and which is for neural networking with at least one other such similarly programmed multi-zone or single-zone irrigation controller, which comprises:

a means for measuring at least one zonal condition for each zone associated with the multi-zone irrigation controller;

a means for setting the initial zonal threshold value for each measured zonal condition, programming into said multi-zone irrigation controller the optimum efficiency range for the pump that supplies water to the main-line pipe, and setting the chronological duration of irrigation for each zone associated with the multi-zone irrigation controller;

a means for measuring the water pressure in the main-line pipe, said water pressure measuring means being positioned upstream from valves which control the flow of water from the main-line pipe into the zones associated with the multi-zone irrigation controller;

a means for determining the chronological length of irrigation for each zone associated with the multi-zone irrigation controller, which means for determining the chronological length of irrigation is connected to the duration and value setting and programming means; and a means for directing a valve which controls the flow of water from the main-line pipe into a given zone associated with the multi-zone irrigation controller to open when any initial zonal threshold value of the given zone has been reached and the water pressure in the main-line pipe is within the optimum efficiency range for the pump that supplies water to the main-line pipe, and for directing the valve which controls the flow of water from the main-line pipe into a given zone associated with the multi-zone irrigation controller to close when either a chronological duration for that zone which has been set by a user or a manufacturer of the irrigation controller has transpired or the water pressure in the main-line pipe has fallen below the optimum efficiency range, which means for directing the valve to open or close is connected to the zonal condition measuring means, the duration and value setting and programming means, the water pressure measuring means, and the means for determining the chronological length of irrigation.

20. A multi-zone irrigation controller which is programmed with the optimum efficiency range for a pump supplying water to a main-line pipe of a pressurized irrigation system and which is for neural networking with at least one other such similarly programmed multi-zone or single-zone irrigation controller, which comprises:

a means for measuring at least one zonal condition for each zone associated with the multi-zone irrigation controller;

a means for setting the initial zonal threshold value for each measured zonal condition, programming into said multi-zone irrigation controller the optimum efficiency range for the pump that supplies water to the main-line pipe, and setting the terminal zonal threshold value for each measure zonal condition;

a means for measuring the water pressure in the main-line pipe, said water pressure measuring means being positioned upstream from valves which control the flow of water from the main-line pipe into the zones associated with the multi-zone irrigation controller; and a means for directing a valve which controls the flow of water from the main-line pipe into a given zone associated with the multi-zone irrigation controller to open when any initial zonal threshold value of the given zone has been reached and the water pressure in the main-line pipe is within the optimum efficiency range for the pump that supplies water to the main-line pipe, and for directing the valve which controls the flow of water from the main-line pipe into a given zone associated with the multi-zone irrigation controller to close when either all terminal zonal threshold values for that zone have been reached or the water pressure in the main-line pipe has fallen below the optimum efficiency range, which means for directing the valve to open or close is connected to the zonal condition measuring means, the value setting and programming means, and the water pressure measuring means.

21. A single-zone irrigation controller for neural networking with at least one other such single-zone or multi-zone irrigation controller, which comprises:

a means for measuring the availability of water in a common source, said water availability measuring means being positioned upstream from a valve, headgate, or zonal pump which controls the flow of water from the source into the zone ;

a means for setting the water threshold values, setting periods of time within which irrigation may commence, and setting the chronological duration of irrigation;

a means for determining the time;

a means for determining the chronological length of irrigation, which is connected to the means for setting periods and duration and values; and a means for directing the valve, headgate, or zonal pump which controls the flow of water from the source into the zone to open or, in the case of the zonal pump, actuate when the time is within a period during which irrigation may commence and the initial water threshold value for the zone has been attained, and for directing the valve, headgate, or zonal pump which controls the flow of water from the source into the zone to close or, in the case of the zonal pump, deactuate when either a chronological duration for that zone which has been set by a user or a manufacturer of the irrigation controller has transpired or the measurement of water in the source has fallen below the terminal water threshold value for the zone, which means for directing the valve, headgate, or zonal pump to open or close or to actuate or deactuate is connected to the water availability measuring means, the means for setting periods and duration and values, the means for determining the time, and the means for determining the chronological length of irrigation.

22. A multi-zone irrigation controller for neural networking with at least one other such multi-zone or single-zone irrigation controller, which comprises:

a means for measuring the availability of water in a common source, said water availability measuring means being positioned upstream from valves, headgates, or zonal pumps which control the flow of water from the source into the zones associated with the multi-zone irrigation controller;

a means for setting the water threshold values for each zone associated with the multi-zone irrigation controller, setting periods of time for each zone associated with the multi-zone irrigation controller within which irrigation of the zone may commence, and setting the chronological duration of irrigation for each zone associated with the multi-zone irrigation controller;

a means for determining the time;

a means for determining the chronological length of irrigation for each zone associated with the multi-zone irrigation controller, which means for determining the chronological length is connected to the means for setting periods and duration and values; and a means for directing a valve, headgate, or zonal pump which controls the flow of water from the source into a given zone associated with the multi-zone irrigation controller to open or, in the case of the zonal pump, actuate when the time is within a period during which irrigation may commence in the given zone and the initial water threshold value for the given zone has been attained, and for directing the valve, headgate, or zonal pump which controls the flow of water from the source into a given zone associated with the multi-zone irrigation controller to close or, in the case of the zonal pump, deactuate when either a chronological duration which has been set by a user or a manufacturer of the irrigation controller for that zone has transpired or the measurement of water in the source has fallen below the terminal water threshold value for that zone, which means for directing the valve, headgate, or zonal pump to open or close or to actuate or deactuate is connected to the water availability measuring means, the means for setting periods and duration and values, the means for determining the time, and the means for determining the chronological length of irrigation.

23. A single-zone irrigation controller which is programmed with the optimum efficiency range for a pump supplying water to a main-line pipe of a pressurized irrigation system and which is for neural networking with at least one other such similarly programmed single-zone or multi-zone irrigation controller, which comprises:

a means for measuring the water pressure in the main-line pipe, said water pressure measuring means being positioned upstream from a valve which controls the flow of water from the main-line pipe into the zone;

a means for programming into said single-zone irrigation controller the optimum efficiency range for the pump that supplies water to the main-line pipe, setting periods of time within which irrigation may commence, and setting the chronological duration of irrigation;

a means for determining the time;

a means for determining the chronological length of irrigation, which is connected to the means for setting periods and duration and programming; and a means for directing the valve which controls the flow of water from the main-line pipe into the zone to open when the time is within a period during which irrigation may commence and the water pressure in the main-line pipe is within the optimum efficiency range for the pump that supplies water to the main-line pipe, and for directing the valve which controls the flow of water from the main-line pipe into the zone to close when either a chronological duration which has been set by a user or a manufacturer of the irrigation controller has transpired or the water pressure in the mainline pipe has fallen below the optimum efficiency range, which means for directing the valve to open or close is connected to the water pressure measuring means, the means for setting periods and duration and programming, the means for determining the time, and the means for determining the chronological length of irrigation.

24. A multi-zone irrigation controller which is programmed with the optimum efficiency range for a pump supplying water to a main-line pipe of a pressurized irrigation system and which is for neural networking with at least one other such similarly programmed multi-zone or single-zone irrigation controller, which comprises:

a means for measuring the water pressure in the main-line pipe, said water pressure measuring means being positioned upstream from valves which control the flow of water from the main-line pipe into the zones associated with the multi-zone irrigation controller;

a means for programming into said multi-zone irrigation controller the optimum efficiency range for the pump that supplies water to the main-line pipe, setting periods of time for each zone associated with the multi-zone irrigation controller within which irrigation of the zone may commence, and setting the chronological duration of irrigation for each zone associated with the multi-zone irrigation controller;

a means for determining the time;

a means for determining the chronological length of irrigation for each zone associated with the multi-zone irrigation controller, which means for determining the chronological length is connected to the means for setting periods and duration and programming; and a means for directing a valve which controls the flow of water from the main-line pipe into a given zone associated with the multi-zone irrigation controller to open when the time is within a period during which irrigation may commence in the given zone and the water pressure in the main-line pipe is within the optimum efficiency range for the pump that supplies water to the main-line pipe, and for directing the valve which controls the flow of water from the main-line pipe into a given zone associated with the multi-zone irrigation controller to close when either a chronological duration which has been set by a user or a manufacturer of the irrigation controller has transpired or the water pressure in the main-line pipe has fallen below the optimum efficiency range, which means for directing the valve to open or close is connected to the water pressure measuring means, the means for setting periods and duration and programming, the means for determining the time, and the means for determining the chronological length of irrigation.

\* \* \* \* \*